US012372281B2

(12) United States Patent
Sim et al.

(10) Patent No.: US 12,372,281 B2
(45) Date of Patent: Jul. 29, 2025

(54) VENTILATION DEVICE AND INTEGRATED AIR CONDITIONING SYSTEM HAVING THE SAME

(71) Applicant: SAMSUNG ELECTRONICS CO., LTD., Suwon-si (KR)

(72) Inventors: Jaehyoung Sim, Suwon-si (KR); Donggyu Lee, Suwon-si (KR); Kyunghoon Kim, Suwon-si (KR); Seojeong Kim, Suwon-si (KR); Sunggoo Kim, Suwon-si (KR); Changmin Seok, Suwon-si (KR); Seonghyun Yoon, Suwon-si (KR); Mingi Cho, Suwon-si (KR); Seungkwan Choi, Suwon-si (KR); Eomji Jang, Suwon-si (KR); Sungjune Cho, Suwon-si (KR); Taesung Choi, Suwon-si (KR); Hyeongjoon Seo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 425 days.

(21) Appl. No.: 17/562,654

(22) Filed: Dec. 27, 2021

(65) Prior Publication Data

US 2022/0178597 A1    Jun. 9, 2022

Related U.S. Application Data

(63) Continuation of application No. PCT/KR2021/017983, filed on Dec. 1, 2021.

(30) Foreign Application Priority Data

Dec. 8, 2020 (KR) .................. 10-2020-0170638
Aug. 18, 2021 (KR) .................. 10-2021-0108574

(51) Int. Cl.
*F25B 41/325* (2021.01)
*F25B 5/02* (2006.01)

(52) U.S. Cl.
CPC .............. *F25B 41/325* (2021.01); *F25B 5/02* (2013.01); *F25B 2600/2513* (2013.01); *F25B 2700/02* (2013.01); *F25B 2700/2104* (2013.01)

(58) Field of Classification Search
CPC .. F25B 41/325; F25B 5/02; F25B 2600/2513; F25B 2700/02; F25B 2700/2104
See application file for complete search history.

(56) References Cited

U.S. PATENT DOCUMENTS

| 5,305,822 A | 4/1994 | Kogetsu et al. |
| 10,495,330 B2 | 12/2019 | Horie et al. |

(Continued)

FOREIGN PATENT DOCUMENTS

| DE | 2525112 | 10/2015 |
| EP | 3 792 565 A1 | 3/2021 |

(Continued)

OTHER PUBLICATIONS

Hashikawa et al. (WO2019193639A1), English Translation, Oct. 10, 2019, Whole Document (Year: 2019).*

(Continued)

*Primary Examiner* — Jerry-Daryl Fletcher
*Assistant Examiner* — Keith Stanley Myers
(74) *Attorney, Agent, or Firm* — STAAS & HALSEY LLP

(57) ABSTRACT

An integrated air conditioning system includes an outdoor unit, an indoor unit, and a ventilation device. The ventilation device includes a housing including an inlet flow path, and an outlet flow path, a total heat exchanger in which air flowing through the inlet flow path and air flowing through the outlet flow path exchange heat with each other, a first (Continued)

heat exchanger disposed on the inlet flow path to receive a refrigerant from the outdoor unit, a second heat exchanger disposed upstream of the first heat exchanger on the inlet flow path and connected to the first heat exchanger to be supplied with refrigerant discharged from the first heat exchanger, a first expansion device to expand the refrigerant supplied to the first heat exchanger from the outdoor unit, and a second expansion device to expand the refrigerant discharged from the first heat exchanger and supplied to the second heat exchanger.

12 Claims, 16 Drawing Sheets

(56) References Cited

U.S. PATENT DOCUMENTS

| | | | |
|---|---|---|---|
| 11,293,655 B2 | 4/2022 | Horie et al. | |
| 2015/0027151 A1* | 1/2015 | Cur | F25B 1/005 62/604 |
| 2019/0011137 A1* | 1/2019 | Horie | F24F 11/77 |
| 2019/0101304 A1* | 4/2019 | Yoon | F24F 11/62 |
| 2020/0200413 A1 | 6/2020 | Horie et al. | |

FOREIGN PATENT DOCUMENTS

| | | |
|---|---|---|
| JP | 5549773 B1 | 7/2014 |
| JP | 2017-053554 A | 3/2017 |
| JP | 6479210 B2 | 3/2019 |
| JP | WO2019/193680 | 10/2019 |
| JP | 6800333 | 12/2020 |
| JP | 2021-42918 | 3/2021 |
| JP | 2022-50948 | 3/2022 |
| KR | 10-0728590 B1 | 6/2007 |
| KR | 10-0816042 B1 | 3/2008 |
| KR | 10-1424578 B1 | 8/2014 |
| KR | 10-2015-0017069 A | 2/2015 |
| KR | 10-2019-0143734 A | 12/2019 |
| KR | 10-2021-0040888 A | 4/2021 |
| KR | 10-2021-0098016 | 8/2021 |
| WO | WO 2019/193639 A1 | 10/2019 |
| WO | WO 2020/226091 A1 | 11/2020 |

OTHER PUBLICATIONS

Doyong et al. (KR20190143734A), English Translation, Dec. 31, 2019 (Year: 2019).*
International Search Report issued in International Application No. PCT/KR2021/017893 dated Mar. 28, 2022.
Office Action dated Feb. 2, 2024, in European Application No. EP 21 90 3730.

* cited by examiner

VENTILATION DEVICE AND INTEGRATED AIR CONDITIONING SYSTEM HAVING THE SAME

CROSS-REFERENCE TO RELATED APPLICATION(S)

This application is a continuation application of International Application No. PCT/KR2021/017983, filed on Dec. 1, 2021, which is based on and claims priority to Korean Patent Application Nos. 10-2020-0170638, filed on Dec. 8, 2020, and 10-2021-0108574, filed on Aug. 18, 2021, in the Korean Intellectual Property Office. The disclosures of International Application No. PCT/KR2021/017983, Korean Patent Application No. 10-2020-0170638, and Korean Patent Application No. 10-2021-0108574 are each incorporated by reference herein in their entirety.

BACKGROUND

1. Field

The disclosure relates to a ventilation device, and for example, to a ventilation device capable of providing fresh air. The disclosure also relates to an integrated air conditioning system having the ventilation device.

2. Description of the Related Art

A ventilation device is a device that supplies outdoor air to an indoor space or exchanges indoor air with outdoor air to ventilate the indoor space.

A known ventilation device has no choice but to control an indoor temperature and humidity only through total heat exchange that is performed between outdoor air and indoor air while the outdoor air and the indoor air pass through a total heat exchanger. Accordingly, the dehumidification of the outdoor air supplied to the indoor space is incomplete, and it is difficult to maintain the indoor temperature and humidity in a fresh state.

SUMMARY

Additional aspects will be set forth in part in the description which follows and, in part, will be apparent from the description, or may be learned by practice of the example embodiments.

One or more aspects of the disclosure relate to an integrated air conditioning system including an outdoor unit including a compressor and a condenser to circulate a refrigerant, an indoor unit connected to the outdoor unit, and a ventilation device connected to the outdoor unit and configured to exchange indoor air with outdoor air. The ventilation device includes a housing including an inlet flow path to suck outdoor air to an indoor space, and an outlet flow path to discharge indoor air to an outdoor space, a total heat exchanger in which air flowing through the inlet flow path and air flowing through the outlet flow path exchange heat with each other, a first heat exchanger disposed on the inlet flow path and configured to receive a refrigerant from the outdoor unit through a first refrigerant pipe, a second heat exchanger disposed upstream of the first heat exchanger on the inlet flow path and configured to be supplied with refrigerant discharged from the first heat exchanger via a second refrigerant pipe connecting the second heat exchanger to the first heat exchanger, a first expansion device disposed on the first refrigerant pipe to expand the refrigerant supplied from the outdoor unit to the first heat exchanger, and a second expansion device disposed on the second refrigerant pipe to expand the refrigerant discharged from the first heat exchanger and supplied to the second heat exchanger.

Air sucked into the inlet flow path may sequentially pass through the total heat exchanger, the second heat exchanger, and the first heat exchanger, and then be discharged into the indoor space.

The first heat exchanger may be configured to heat or dehumidify air and the second heat exchanger may be configured to dehumidify air.

In response to the first expansion device expanding the refrigerant, the first heat exchanger and the second heat exchanger may be configured to cool and dehumidify the air, which passes through the first heat exchanger and the second heat exchanger, by evaporating the refrigerant.

In response to the first expansion device not expanding the refrigerant and the second expansion device expanding the refrigerant, the second heat exchanger may be configured to dehumidify the air passing through the second heat exchanger by evaporating the refrigerant, and the first heat exchanger may be configured to heat the air passing through the first heat exchanger by condensing the refrigerant.

The integrated air conditioning system may further include an indoor temperature sensor configured to measure an indoor temperature, an indoor humidity sensor configured to measure an indoor humidity, and a controller configured to control the ventilation device based on the indoor temperature measured by the indoor temperature sensor and the indoor humidity measured by the indoor humidity sensor.

In response to the indoor temperature measured by the indoor temperature sensor being greater than a set temperature and the indoor humidity measured by the indoor humidity sensor being greater than set humidity, the controller may be configured to control the ventilation device to be operated in a first dehumidification mode in which the first heat exchanger and the second heat exchanger are configured to cool and dehumidify the air as the first expansion device expands the refrigerant.

In response to the indoor temperature measured by the indoor temperature sensor being less than the set temperature and the indoor humidity measured by the indoor humidity sensor being greater than the set humidity, the controller may be configured to control the ventilation device to be operated in a second dehumidification mode in which the first heat exchanger is configured to heat the air as the first expansion device does not expand the refrigerant, and the second heat exchanger is configured to dehumidify the air as the second expansion device expands the refrigerant.

The total heat exchanger may be disposed on the outlet flow path, and the indoor temperature sensor and the indoor humidity sensor may be disposed inside the housing and may be disposed upstream of the total heat exchanger on the outlet flow path.

The integrated air conditioning system may further include a discharge temperature sensor configured to measure a discharge temperature, which is a temperature of air discharged into the indoor space after passing through the first and second heat exchangers, and a cooling fan configured to cool the condenser. The controller may be configured to control a rotation speed of the cooling fan.

In response to the discharge temperature measured by the discharge temperature sensor being greater than the indoor temperature measured by the indoor temperature sensor, the controller may be configured to increase the rotation speed of the cooling fan, and in response to the discharge temperature measured by the discharge temperature sensor being less than the indoor temperature measured by the indoor temperature sensor, the controller may be configured to reduce the rotation speed of the cooling fan.

The integrated air conditioning system may further include a distributor configured to receive the refrigerant from the outdoor unit, and the indoor unit may be configured to receive the refrigerant from the outdoor unit via the distributor. The ventilation device may be configured to receive the refrigerant from the outdoor unit via the distributor.

At least one of the first expansion device and the second expansion device may include an electronic expansion valve (EEV) in which a degree of opening is adjustable.

At least one of the first expansion device and the second expansion device may include a solenoid valve and a capillary tube connected in parallel to the solenoid valve.

The housing may include a first inlet chamber including an inlet through which the outdoor air is introduced into the housing, the inlet flow path being formed in the first inlet chamber, and a second inlet chamber to communicate with the first inlet chamber by the total heat exchanger and including an outlet through which air in the inlet flow path is discharged to the indoor space. The first heat exchanger and the second heat exchanger may be disposed inside the second inlet chamber.

One or more aspects of the disclosure relate to a ventilation system configured to supply outdoor air to an indoor space, the ventilation system including a compressor, a first heat exchanger configured to receive a refrigerant discharged from the compressor, a first expansion device configured to selectively expand a refrigerant supplied to the first heat exchanger, a second heat exchanger configured to receive a refrigerant from the first heat exchanger, and a second expansion device configured to selectively expand a refrigerant supplied to the second heat exchanger. Outdoor air may pass through the second heat exchanger and the first heat exchanger sequentially and then is discharged into an indoor space.

In response to the first expansion device expanding the refrigerant, the first heat exchanger and the second heat exchanger may cool and dehumidify the air by evaporating the refrigerant.

In response to the first expansion device not expanding the refrigerant and the second expansion device expanding the refrigerant, the first heat exchanger may heat the air by condensing the refrigerant and the second heat exchanger may dehumidify the air by evaporating the refrigerant.

The ventilation system may include an inlet flow path to suck outdoor air to an indoor space, a total heat exchanger disposed on the inlet flow path, a first heat exchanger disposed downstream of the total heat exchanger on the inlet flow path, a second heat exchanger disposed downstream of the total heat exchanger and upstream of the first heat exchanger on the inlet flow path, the second heat exchanger configured to receive a refrigerant from the first heat exchanger, a first expansion device configured to selectively expand a refrigerant supplied to the first heat exchanger, and a second expansion device configured to selectively expand a refrigerant supplied from the first heat exchanger to the second heat exchanger. When one of the first expansion device and the second expansion device expands the refrigerant, the other of the first expansion device and the second expansion device may not expand the refrigerant.

The ventilation system may further include an indoor temperature sensor configured to measure an indoor temperature, an indoor humidity sensor configured to measure indoor humidity, and a controller configured to control the first expansion device and the second expansion device based on the indoor temperature and indoor humidity. In response to the measured indoor temperature being greater than a set temperature and the measured indoor humidity being greater than a set humidity, the controller may be configured to control the first expansion device to expand the refrigerant and be configured to control the second expansion device not to expand the refrigerant. In response to the measured indoor temperature being less than the set temperature and the measured indoor humidity being greater than the set humidity, the controller may be configured to control the first expansion device not to expand the refrigerant and be configured to control the second expansion device to expand the refrigerant.

BRIEF DESCRIPTION OF THE DRAWINGS

The above and other aspects, features, and advantages of example embodiments of the disclosure will be more apparent from the following description taken in conjunction with the accompanying drawings, in which.

DETAILED DESCRIPTION

Figure 1:
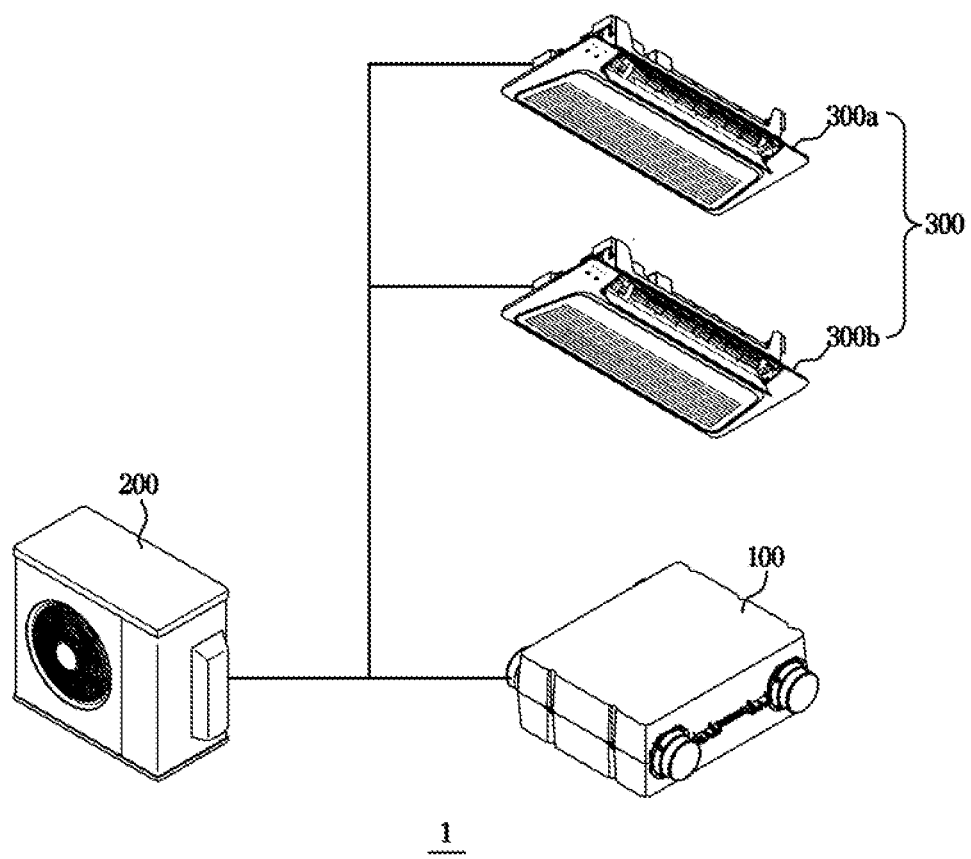
FIG. 1 is a view illustrating a concept of an integrated air conditioning system according to an embodiment of the disclosure.

Embodiments described in the disclosure and configurations illustrated in the drawings are merely examples of the embodiments of the disclosure, and may be modified in various different ways to replace the embodiments and drawings of the disclosure.

In addition, the same reference numerals or signs illustrated in the drawings of the disclosure indicate elements or components performing substantially the same function. The shapes and sizes of elements in the drawings may be exaggerated for clear description.

It will be understood that when an element is referred to as being "connected" to another element, it can be directly or indirectly connected to the other element, wherein the indirect connection may include "connection via a wireless communication network" or a "connection through another part".

Also, the terms used herein are used to describe the embodiments and are not intended to limit and/or restrict the disclosure. The singular forms "a," "an" and "the" are intended to include the plural forms as well, unless the context clearly indicates otherwise. In this disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, but elements are not limited by these terms. These terms are only used to distinguish one element from another element. For example, without departing from the scope of the disclosure, a first element may be termed as a second element, and a second element may be termed as a first element.

Descriptions shall be understood as to include any and all combinations of one or more of the associated listed items when the items are described by using the conjunctive term "and/or," or the like. That is, the term "and/or" includes a plurality of combinations of relevant items or any one item among a plurality of relevant items. Thus, the scope of the expression or phrase "A and/or B" includes all of the following: (1) the item "A", (2) the item "B", and (3) the combination of items "A and B".

In addition, the scope of the expression or phrase "at least one of A and B" is intended to include all of the following: (1) at least one of A, (2) at least one of B, and (3) at least one A and at least one of B. Likewise, the scope of the expression or phrase "at least one of A, B, and C" is intended to include all of the following: (1) at least one of A, (2) at least one of B, (3) at least one of C, (4) at least one of A and at least one of B, (5) at least one of A and at least one of C, (6) at least one of B and at least one of C, and (7) at least one of A, at least one of B, and at least one of C.

In the following detailed description, the terms of "front", "rear", "upper portion", "lower portion", and the like may be defined by the drawings, but the shape and the location of the component is not limited by the term.

One or more aspects of the disclosure are directed to providing a ventilation device capable of adjusting a temperature and humidity of air, which is supplied to an indoor space, to be in a fresh state, and an integrated air conditioning system having the same.

Further, one or more aspects of the disclosure are directed to providing a ventilation device capable of being operated using a known outdoor unit of an air conditioner and an integrated air conditioning system having the same.

According to examples disclosed herein, a ventilation device may adjust a temperature and humidity of sucked outdoor air by using a plurality of heat exchangers arranged on an inlet flow path of the ventilation device, and discharge the conditioned air to an indoor space. Therefore, it is possible to maintain the temperature and humidity of the indoor space in a fresh state.

Further, according to examples disclosed herein, a ventilation device may be connected to a known outdoor unit of air conditioner and thus a refrigerant may be circulated in a ventilation system by the outdoor unit. Therefore, it is possible to miniaturize the ventilation device and to reduce a production cost.

Hereinafter, embodiments of the disclosure will be described in detail with reference to the accompanying drawings.

Figure 2:
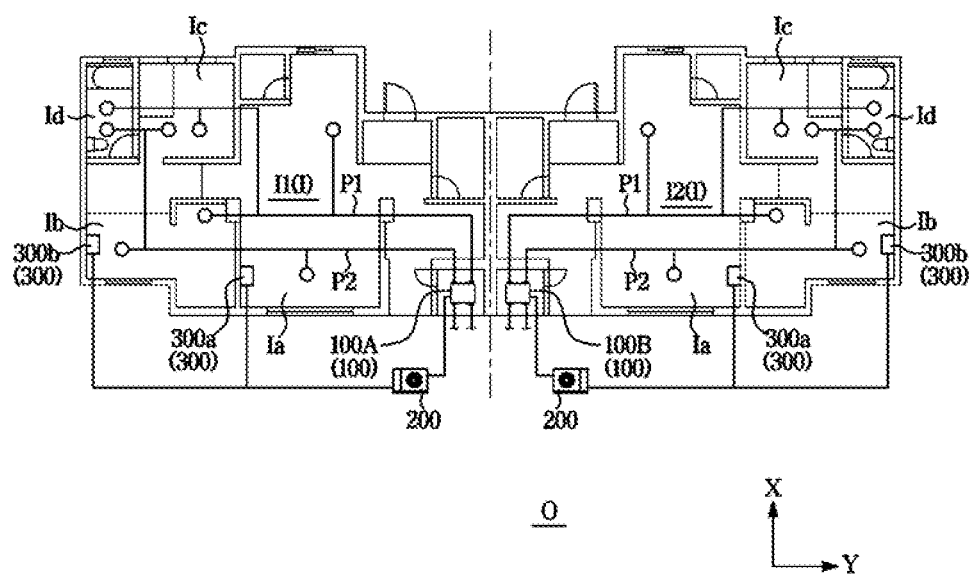
FIG. 2 is a view schematically illustrating a case in which the integrated air conditioning system illustrated in FIG. 1 is arranged in a space.
Figure 3:
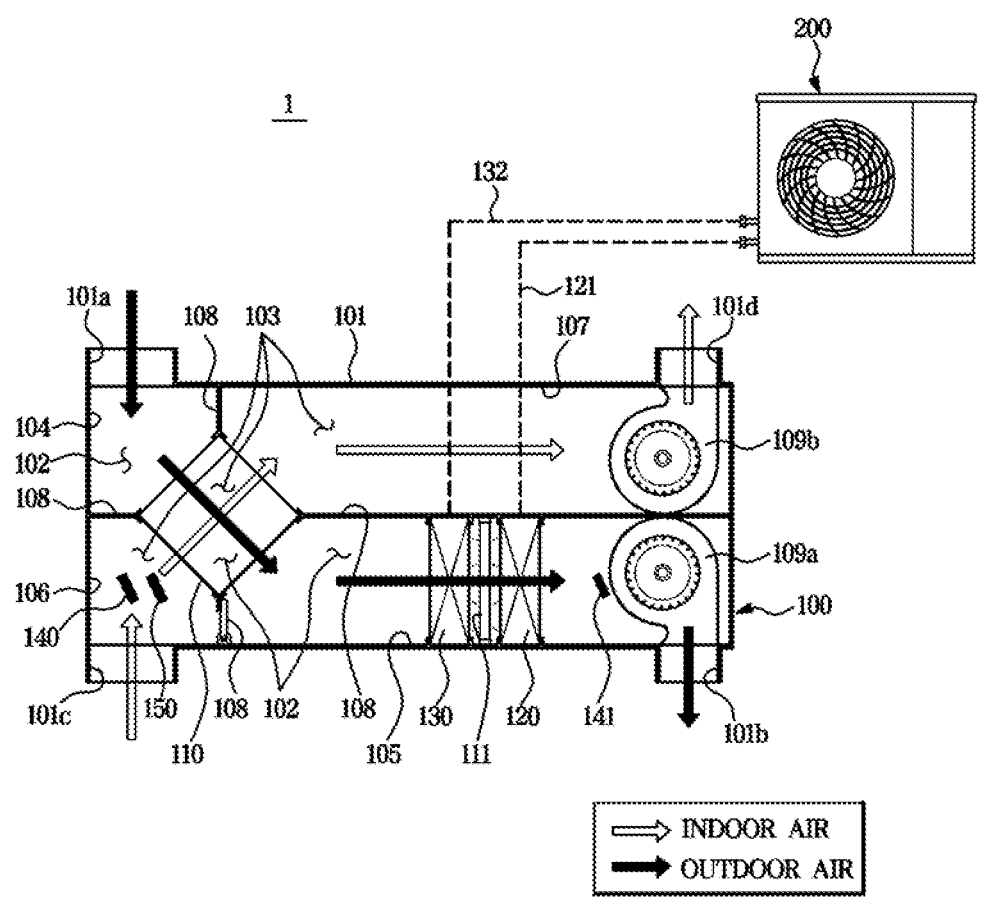
FIG. 3 is a view illustrating a part of the integrated air conditioning system according to an embodiment of the disclosure.
Figure 4:
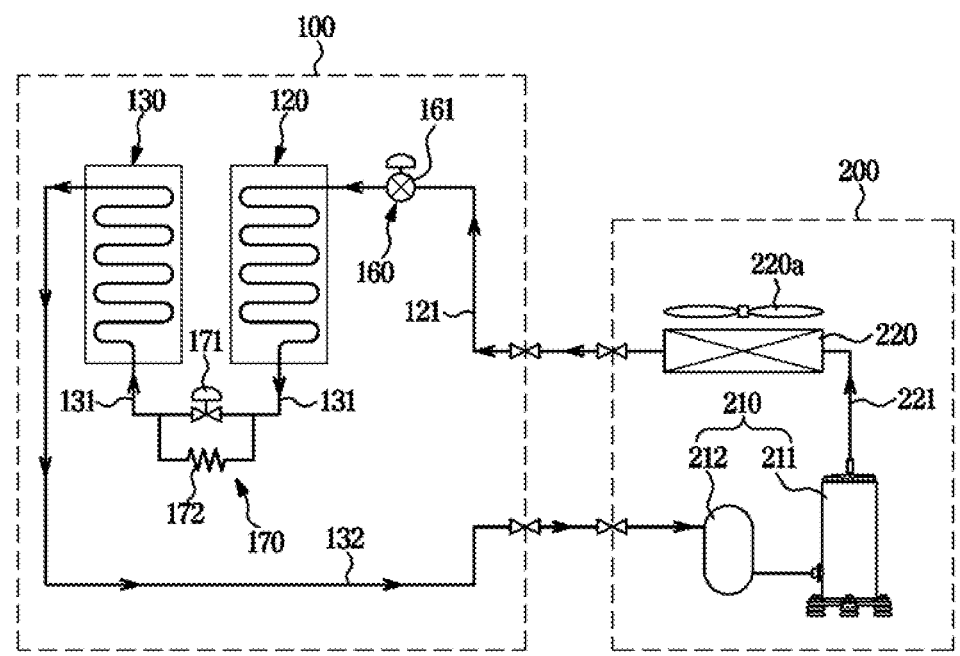
FIG. 4 is a view illustrating a circulation of a refrigerant in the integrated air conditioning system illustrated in FIG. 3.
Figure 5:
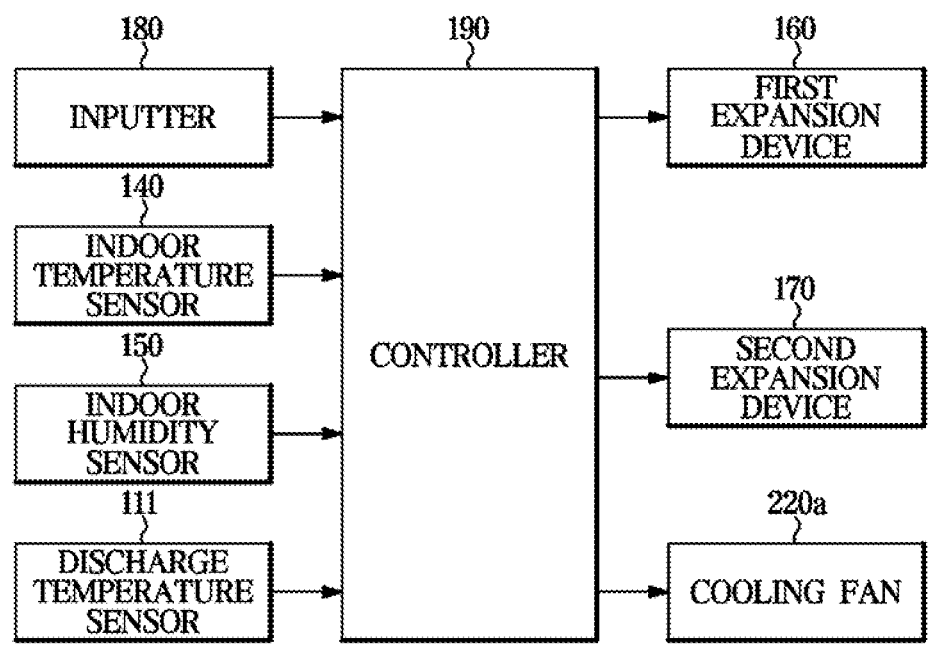
FIG. 5 is a control block diagram illustrating the integrated air conditioning system illustrated in FIG. 3.

FIG. 1 is a view illustrating a concept of an integrated air conditioning system according to an embodiment of the disclosure. FIG. 2 is a view schematically illustrating a case in which the integrated air conditioning system illustrated in FIG. 1 is arranged in a space. FIG. 3 is a view illustrating a part of the integrated air conditioning system according to an embodiment of the disclosure. FIG. 4 is a view illustrating a circulation of a refrigerant in the integrated air conditioning system illustrated in FIG. 3. FIG. 5 is a control block diagram illustrating the integrated air conditioning system illustrated in FIG. 3.

Referring to FIGS. 1 to 5, an integrated air conditioning system 1 may include a ventilation device 100 provided to communicate with an indoor space and an outdoor space and configured to exchange indoor air and outdoor air, and an outdoor unit 200 connected to the ventilation device 100 to circulate a refrigerant supplied to the ventilation device 100.

The integrated air conditioning system 1 may include a second device 300 connected to the outdoor unit 200 together with the ventilation device 100. The second device 300 may correspond to a separate air conditioning device including an indoor unit of the air conditioner. In the disclosure, an indoor unit disposed in parallel to the indoor space I together with the ventilation device 100 will be described as an example. The second device 300 may include a plurality of second devices 300*a*, 300*b* to be included in the integrated air conditioning system 1.

A general ventilation device does not include the outdoor unit 200, and is configured to circulate air between the indoor space I and the outdoor space O by using the ventilation device 100 and is configured to allow heat exchange between air, which flows from the outdoor space O to the indoor space I, and air, which is discharged from the indoor space I to the outdoor space O, to be performed by a total heat exchanger 110 arranged in the ventilation device 100.

However, the integrated air conditioning system 1 according to an embodiment of the disclosure may include the outdoor unit 200, and the ventilation device 100 may include heat exchangers 120 and 130 connected to the outdoor unit 200 so as to exchange heat between air, which flows from the outdoor space O to the indoor space I, and air, which is discharged from the indoor space I to the outdoor space O, and further to dehumidify air supplied to the indoor space I.

That is, the ventilation device 100 and the second device 300 corresponding to an indoor unit, may be connected in parallel to the outdoor unit 200 and respectively arranged in the indoor space I to perform ventilation, air purification, and dehumidification, and to provide an appropriate air temperature inside the indoor space I. Dehumidification and air purification of the indoor space I will be described in detail below.

In addition, as illustrated in FIGS. 1 and 2, the integrated air conditioning system 1 includes not only the ventilation device 100 but also the second device 300 configured to serve as an indoor unit in the indoor space I so as to facilitate dehumidification while supplying air at an appropriate temperature to an entire area of the indoor space I.

A known ventilation device may only supply outdoor air to an indoor space and discharge indoor air to an outdoor space, and thus it is impossible for the known ventilation device to dehumidify the indoor air. Therefore, to dehumidify the indoor air, a separate indoor unit or a dehumidifier is needed.

However, the ventilation device 100 of the integrated air conditioning system 1 according to the disclosure may independently provide air, which is dehumidified in the ventilation device 100 through the heat exchangers 120 and 130, to the indoor space I, so as to provide the dehumidified air to the indoor space I while circulating the air of the indoor space I.

Further, as for the integrated air conditioning system 1 according to the disclosure, the outdoor unit 200, the ventilation device 100 and the second device 300 configured to serve as the indoor unit may be arranged in parallel to each other, and thus the ventilation device 100 and the second device 300 connected to the outdoor unit 200 may be arranged in the indoor space I. Therefore, the integrated air conditioning system 1 may supply air having an appropriate temperature and humidity to each region Ia, Ib, Ic, and Id of the indoor space I.

As illustrated in FIG. 2, the ventilation device 100 may disposed in the indoor space I, and the first and second pipes P1, and P2 formed in the indoor space I may be connected to a first outlet 101*b* and a second inlet 101*c*, which is to be described later, of the ventilation device 100, and each of the pipes P1 and P2 may extend to the each region Ia, Ib, Ic, and Id of the indoor space I so as to ventilate the each region Ia, Ib, Ic, and Id of the indoor space I.

Air introduced into the ventilation device 100 from the outdoor space O may be dehumidified in the ventilation device 100, and then supplied to a first region Ia, a second region Ib, a third region Ic and a fourth region Id independently of each other through a first pipe P1.

Indoor air in the first region Ia, the second region Ib, the third region Ic and the fourth region Id may be introduced into the ventilation device 100 through the second pipe P2 and then discharged to the outdoor space O.

Further, the second device 300 arranged in the indoor space I may be provided as a plurality of second devices and thus be installed in a plurality of regions among the plurality of regions Ia, Ib, Ic, and Id of the indoor space I so as to supply air at an appropriate temperature to each of the regions Ia, Ib, Ic, and Id of the indoor space I, independently of each other.

An indoor humidity sensor 150 and an indoor temperature sensor 140, which will be described later, may be independently arranged in each region Ia, Ib, Ic, and Id, and the ventilation device 100 may be operated by a controller 190, which will be described later, according to a state of air of each region Ia, Ib, Ic, and Id. Therefore, it is possible to prevent inappropriate air from being circulated in some regions among the regions Ia, Ib, Ic, and Id. For example, humidity of the fourth region Id, in which a toilet is placed, may be greater than other regions Ia, Ib, and Ic, and in this case, even when an imbalance in humidity occurs in some region Id among the regions Ia, Ib, Ic, and Id, it is possible to easily provide fresh air by driving the ventilation device 100 which can be configured to dehumidify and thus it is possible to provide air having the appropriate temperature and humidity to the entire indoor space I.

The above-described regions Ia, Ib, Ic, and Id and the first and second pipes P1 and P2 are arbitrarily distinguished and may be defined in various ways according to the shape and partition structure of the indoor space I.

According to a user input or control of the controller 190 described later, the integrated air conditioning system 1 may be selectively operated in any one state among a ventilation system state in which only the ventilation device 100 is operated in the indoor space I, an integrated air conditioning system state in which both of the ventilation device 100 and the second device 300 are operated, and a cooling and heating system state in which only the second device 300 is operated.

Each state of the integrated air conditioning system 1 may be selected and performed by a user input or control of the controller 190 according to conditions such as temperature, humidity, and pollution level of the air flowing inside the indoor space I. This will be described later in detail.

Hereinafter technical features of the outdoor unit 200 and the ventilation device 100 in the integrated air conditioning system 1 will be described in detail as illustrated in FIGS. 3 to 5. Hereinafter only the ventilation device 100 and the outdoor unit 200 will be described, except for the description of the second device 300.

An operation of the ventilation device 100 described below may correspond to both of the integrated air conditioning system state in which both of the ventilation device 100 and the second device 300 are operated and the ventilation system state in which only the ventilation device 100 is operated. The outdoor unit 200 may include a compressor 210 and a condenser 220. The compressor 210 may include an accumulator 212 and a compressor body 211. The condenser 220 may be referred to as an 'outdoor heat exchanger'. The compressor 210 and the condenser 220 may be connected through a refrigerant pipe 221. The outdoor unit 200 may include a cooling fan 220*a* configured to control a temperature of the condenser 220. The cooling fan 220*a* may discharge air toward the condenser 220 and may cool the condenser 220. When the condenser 220 is cooled by the cooling fan 220*a*, a temperature of the refrigerant passing through the condenser 220 may be reduced in comparison with a case in which the cooling fan 220*a* is not provided.

The drawings in the disclosure schematically illustrate a configuration of the outdoor unit 200 at a practicable level. Because the outdoor unit 200 corresponds to an outdoor unit for a known air conditioner, various modifications to the example configuration shown in FIG. 4 may be made to the implementation of the outdoor unit 200. The outdoor unit 200 may be provided at a technical level that is generally understood by those skilled in the art based on the contents of the disclosure.

As described above, because the integrated air conditioning system 1 may be operated by using the outdoor unit 200 that is commonly used, the ventilation device 100 does not include a separate compressor, and thus it is possible to miniaturize the ventilation device 100 and reduce production costs.

The ventilation device 100 may include a housing 101 provided to form an exterior. The housing 101 may be provided in a substantially box shape. The housing 101 may include an inlet flow path 102 provided to suck outdoor air into the indoor space, and an outlet flow path 103 provided to discharge indoor air to the outdoor space. The inlet flow path 102 and the outlet flow path 103 may be partitioned from each other by a plurality of partition walls 108.

The housing 101 may include a first inlet chamber 104 and a second inlet chamber 105. The first inlet chamber 104 may include a first inlet 101a provided to communicate with the outdoor space to allow the outdoor air to be sucked into the inside of the housing 101, and the inlet flow path 102 may be formed in the first inlet chamber 104. The second inlet chamber 105 may include a first outlet 101b provided to communicate with the indoor space to allow the outdoor air, which is to be sucked into the housing 101, to be discharged to the indoor space and the inlet flow path 102 may be formed in the second inlet chamber 105. The inlet flow path 102 may connect the first inlet 101a to the first outlet 101b.

The housing 101 may include a first outlet chamber 106 and a second outlet chamber 107. The first outlet chamber 106 may include a second inlet 101c provided to communicate with the indoor space to allow the indoor air to be sucked into the inside of the housing 101, and the outlet flow path 103 may be formed in the first outlet chamber 106. The second outlet chamber 107 may include a second outlet 101d provided to communicate with the outdoor space to allow the indoor air, which is to be sucked into the housing 101, to be discharged to the outside and the outlet flow path 103 may be formed in the second outlet chamber 107. The outlet flow path 103 may connect the second inlet 101c to the second outlet 101d.

The ventilation device 100 may include an intake blower 109a arranged inside the second inlet chamber 105, and configured to generate a blowing force required to suck the outdoor air into the indoor space, and provided to communicate with the first outlet 101b. The ventilation device 100 may include an exhaust blower 109b arranged inside the second outlet chamber 107, and configured to generate a blowing force required to discharge the indoor air into the outside, and provided to communicate with the second outlet 101d.

The ventilation device 100 may include the total heat exchanger 110 in which air, which flows through the outlet flow path 103 and air, which flows through the inlet flow path 102, exchange heat with each other. The total heat exchanger 110 may correspond to a plate type total heat exchanger or a rotary type total heat exchanger. The total heat exchanger 110 may be arranged at a point in which the inlet flow path 102 and the outlet flow path 103 intersect. That is, the total heat exchanger 110 may be arranged on the inlet flow path 102 and at the same time, arranged on the outlet flow path 103.

The total heat exchanger 110 may allow the first inlet chamber 104 to communicate with the second inlet chamber 105. The total heat exchanger 110 may allow the first outlet chamber 106 to communicate with the second outlet chamber 107.

The ventilation device 100 may include the first heat exchanger 120 and the second heat exchanger 130 configured to adjust humidity and temperature of the air flowing through the inlet flow path 102.

The first heat exchanger 120 and the second heat exchanger 130 may be provided on the inlet flow path 102. The first heat exchanger 120 and the second heat exchanger 130 may be arranged inside the second inlet chamber 105. That is, the first heat exchanger 120 and the second heat exchanger 130 may be arranged downstream of the inlet flow path 102 than the total heat exchanger 110.

The second heat exchanger 130 may be arranged further upstream of the inlet flow path 102 than the first heat exchanger 120. In other words, the first heat exchanger 120 may be arranged further downstream of the inlet flow path 102 than the second heat exchanger 130. The outdoor air sucked in through the first inlet 101a may sequentially pass through the first inlet chamber 104, the total heat exchanger 110, the second heat exchanger 130, and the first heat exchanger 120, and then be discharged into the indoor space through the first outlet 101b.

Air, which flows on the inlet flow path 102 from the first inlet 101a toward the first outlet 101b, may be dehumidified by the second heat exchanger 130. The air passing through the second heat exchanger 130 may be heated, cooled, and dehumidified by the first heat exchanger 120.

The first heat exchanger 120 may be connected to the outdoor unit 200 through the first refrigerant pipe 121. The first heat exchanger 120 may be connected to the condenser 220 of the outdoor unit 200 through the first refrigerant pipe 121.

The second heat exchanger 130 may be connected to the first heat exchanger 120 through a second refrigerant pipe 131. The second heat exchanger 130 may be connected to the outdoor unit 200 through a third refrigerant pipe 132. The second heat exchanger 130 may be connected to the accumulator 212 of the outdoor unit 200 through the third refrigerant pipe 132.

The ventilation device 100 may include a first expansion device 160 provided in the first refrigerant pipe 121. The first expansion device 160 may selectively expand a refrigerant supplied to the first heat exchanger 120 through the first refrigerant pipe 121. The refrigerant passing through the first expansion device 160 may be in a reduced pressure state than before passing through the first expansion device 160.

The ventilation device 100 may include a second expansion device 170 provided in the second refrigerant pipe 131. The second expansion device 170 may selectively expand a refrigerant that is discharged from the first heat exchanger 120 and supplied to the second heat exchanger 130 through the second refrigerant pipe 131. The refrigerant passing through the second expansion device 170 may be in a reduced pressure state than before passing through the second expansion device 170.

The first expansion device 160 and the second expansion device 170 may be arranged inside the housing 101. The second refrigerant pipe 131 may be arranged inside the housing 101.

The first expansion device 160 may include an electronic expansion valve (EEV) 161 configured to expand a high-temperature and high-pressure refrigerant into a low-temperature and low-pressure refrigerant by a throttling action, and configured to adjust a flow rate of the refrigerant supplied to the first heat exchanger 120. The EEV 161 may adjust a degree of expansion of the refrigerant and a flow rate of the refrigerant by regulating a degree of opening. When the EEV 161 is fully opened, the refrigerant may pass through the EEV 161 without resistance, and the EEV 161 may not expand the refrigerant.

The second expansion device 170 may include a solenoid valve 171 and a capillary tube 172 connected in parallel to the solenoid valve 171 so as to expand a high-temperature and high-pressure refrigerant into a low-temperature and low-pressure refrigerant by the throttling action. When the solenoid valve 171 is closed, the refrigerant may be moved to the capillary tube 172 and be expanded by the throttling action, and when the solenoid valve 171 is opened, the refrigerant may flow without resistance through the solenoid valve 171 and not be expanded. In order to efficiently control the flow and expansion of the refrigerant, the solenoid valve 171 may be replaced with an EEV.

However, the disclosure is not limited thereto. For example, both the first expansion device 160 and the second expansion device 170 may include only an EEV. The first expansion device 160 may include a solenoid valve and a capillary tube connected in parallel to the solenoid valve, and the second expansion device 170 may include an EEV. Both the first expansion device 160 and the second expansion device 170 may include a solenoid valve and a capillary tube connected in parallel to the solenoid valve. It should be understood that a solenoid valve connected in parallel to a capillary tube may be replaced with an EEV.

The integrated air conditioning system 1 may include the controller 190 configured to control the ventilation device 100 and/or the outdoor unit 200 based on an indoor temperature, and/or indoor humidity, and/or a discharge temperature. That is, the controller 190 may be configured to control the ventilation device 100 based on at least one of an indoor temperature, indoor humidity, and a discharge temperature, and the controller 190 may additionally or alternatively be configured to control the outdoor unit 200 based on at least one of an indoor temperature, indoor humidity, and a discharge temperature. The controller 190 may be provided in the ventilation device 100. The controller 190 may be electrically connected to the first expansion device 160 and the second expansion device 170, and may control the first expansion device 160 and the second expansion device 170.

For example, the controller 190 may control the first expansion device 160 to expand or not to expand the refrigerant by adjusting the opening and closing of the EEV 161 of the first expansion device 160 and the degree of opening and closing thereof. The controller 190 may control the second expansion device 170 to expand or not to expand the refrigerant by adjusting the opening and closing of the solenoid valve 171 of the second expansion device 170.

The controller 190 may control a rotation speed of the cooling fan 220a of the outdoor unit 200. The controller 190 may increase or decrease the rotation speed of the cooling fan 220a. As the rotation speed of the cooling fan 220a increases, the condenser 220 of the outdoor unit 200 may radiate more heat, and the temperature of the refrigerant passing through the condenser 220 may be further reduced.

The integrated air conditioning system 1 may include the indoor temperature sensor 140 configured to measure an indoor temperature and the indoor humidity sensor 150 configured to measure indoor humidity. The integrated air conditioning system 1 may include a discharge temperature sensor 141 configured to measure a discharge temperature, which is a temperature of air discharged into the indoor space after passing through the first and second heat exchangers 120 and 130. The humidity may refer to relative humidity. The indoor temperature sensor 140, the indoor humidity sensor 150, and the discharge temperature sensor 141 may be connected to the controller 190 in a wired and/or wireless manner, and may transmit a measured value to the controller 190.

The integrated air conditioning system 1 may include an inputter 180 configured to receive a set temperature and set humidity. The inputter 180 may receive an input value for selecting a first dehumidification mode, a second dehumidification mode, or a ventilation mode. The inputter 180 may be provided in the ventilation device 100 or may be provided in an inputter provided separately from the ventilation device 100. The inputter 180 may be connected to the controller 190 in a wired and/or wireless manner, and may transmit an input value to the controller 190.

The indoor temperature sensor 140 and the indoor humidity sensor 150 may be provided on the outlet flow path 103. The indoor temperature sensor 140 and the indoor humidity sensor 150 may be arranged inside the first outlet chamber 106. The indoor temperature sensor 140 and the indoor humidity sensor 150 may be arranged further upstream of the outlet flow path 103 than the total heat exchanger 110. The indoor temperature sensor 140 and the indoor humidity sensor 150 may measure the temperature and humidity of the indoor air sucked through the second inlet 101c. However, the disclosure is not limited thereto, and the indoor temperature sensor 140 and the indoor humidity sensor 150 may be arranged outside the housing 101.

The discharge temperature sensor 141 may be provided on the inlet flow path 102. The discharge temperature sensor 140 may be arranged inside the second inlet chamber 105. The discharge temperature sensor 141 may be arranged downstream of the inlet flow path 102 than the total heat exchanger 110, the first heat exchanger 120, and the second heat exchanger 130. The discharge temperature sensor 141 may measure the temperature of the air discharged into the indoor space through the first outlet 101b. However, the disclosure is not limited thereto, and the discharge temperature sensor 141 may be arranged outside the housing 101.

The ventilation device 100 may include a sterilizer 111 configured to sterilize the first heat exchanger 120 and the second heat exchanger 130. The sterilizer 111 may include an ultraviolet light source configured to irradiate ultraviolet light. For example, the sterilizer 111 may include a UV-LED.

The sterilizer 111 may be arranged between the first heat exchanger 120 and the second heat exchanger 130. Accordingly, a single sterilizer 111 may simultaneously sterilize the first heat exchanger 120 and the second heat exchanger 130 arranged on opposite sides of the sterilizer 111.

Hereinafter the operation of the integrated air conditioning system 1 will be described in detail. The operation described below will be described only with respect to the operation of the ventilation device 100 and the outdoor unit 200. The operation described below may be equally applied to both the integrated air conditioning system state and the ventilation system state of the integrated air conditioning system 1.

The integrated air conditioning system 1 may be operated in one of the first dehumidification mode, the second dehumidification mode, or the ventilation mode based on the indoor temperature and indoor humidity. The controller 190 may control the integrated air conditioning system 1 to be operated in the first dehumidification mode, the second dehumidification mode, or the ventilation mode. Based on the indoor temperature and indoor humidity, the integrated air conditioning system 1 may be switched between the first dehumidification mode and the ventilation mode or switched between the second dehumidification mode and the ventilation mode. Further, the integrated air conditioning system 1 may be switched between the first dehumidification mode and the second dehumidification. The controller 190 may control switching between each mode.

The ventilation mode refers to a state in which the first heat exchanger 120 and the second heat exchanger 130 are not operated, and only total heat exchange by the total heat exchanger 110 is performed. The controller 190 may block the refrigerant flowing to the ventilation device 100 or block the refrigerant flowing to the ventilation device 100 so as to prevent the refrigerant from flowing into the first heat exchanger 120 and second heat exchanger 130, or turn off the outdoor unit 200, thereby allowing the integrated air conditioning system 1 to be operated in the ventilation mode.

The first dehumidification mode will be described. In the first dehumidification mode, the first expansion device 160 may expand the refrigerant. The second expansion device 170 may or may not expand the refrigerant. It is appropriate that, in order to smoothly move the refrigerant, the solenoid valve 171 of the second expansion device 170 may be opened and the second expansion device 170 may not expand the refrigerant in the first dehumidification mode.

The high-temperature and high-pressure refrigerant discharged from the compressor body 211 may be condensed in the condenser 220 of the outdoor unit 200 and then introduced into the first expansion device 160. The first expansion device 160 may expand the high-temperature and high-pressure refrigerant to a low-temperature and low-pressure state to allow the refrigerant to be evaporated in the first heat exchanger 120 and the second heat exchanger 130.

The refrigerant expanded in the first expansion device 120 may be evaporated by passing through the first heat exchanger 120. The refrigerant discharged from the first heat exchanger 120 and introduced into the second heat exchanger 130 may be evaporated once again in the second heat exchanger 130. The first heat exchanger 120 and the second heat exchanger 130 may condense and remove moisture contained in the air passing through the first heat exchanger 120 and the second heat exchanger 130, and cool the air passing through the first heat exchanger 120 and the second heat exchanger 130. That is, the ventilation device 100 operated in the first dehumidification mode may simultaneously reduce the temperature and humidity of outdoor air sucked into the indoor space. By the ventilation device 100 operated in the first dehumidification mode, the air supplied to the indoor space may have a temperature and humidity that can be felt comfortably by the user.

The second dehumidification mode will be described. In the second dehumidification mode, the first expansion device 160 may not expand the refrigerant. The second expansion device 170 may expand the refrigerant.

The high-temperature and high-pressure refrigerant discharged from the compressor body 211 may be condensed in the condenser 220 of the outdoor unit 200 and then introduced into the first heat exchanger 120. The first heat exchanger 120 supplied with the refrigerant may condense the refrigerant. The high-temperature and high-pressure refrigerant discharged from the first heat exchanger 120 may be expanded by the second expansion device 170 to be a low-temperature and low-pressure refrigerant. The expanded refrigerant in the low-temperature and low-pressure state may be introduced into the second heat exchanger 130, and the second heat exchanger 130 may evaporate the refrigerant.

Air flowing through the inlet flow path 102 may sequentially pass through the second heat exchanger 130 and the first heat exchanger 120. The second heat exchanger 130 may condense and remove moisture contained in the air passing through the second heat exchanger 130, and the air passing through the second heat exchanger 130 may be cooled and dehumidified. The first heat exchanger 120 may heat air, from which moisture is removed by the second heat exchanger 130, by condensing the refrigerant. The air, which is cooled by passing through the second heat exchanger 130, may be heated again by the first heat exchanger 120 and thus the air may have a temperature greater than when passing through the second heat exchanger 130.

Accordingly, relative humidity of the air passing through the second heat exchanger 130 and the first heat exchanger 120 may be less than relative humidity of the air passing through only the second heat exchanger 130. Accordingly, the air passing through the second heat exchanger 130 and the first heat exchanger 120 may have the temperature and humidity that can be comfortably felt by a user.

Figure 6:
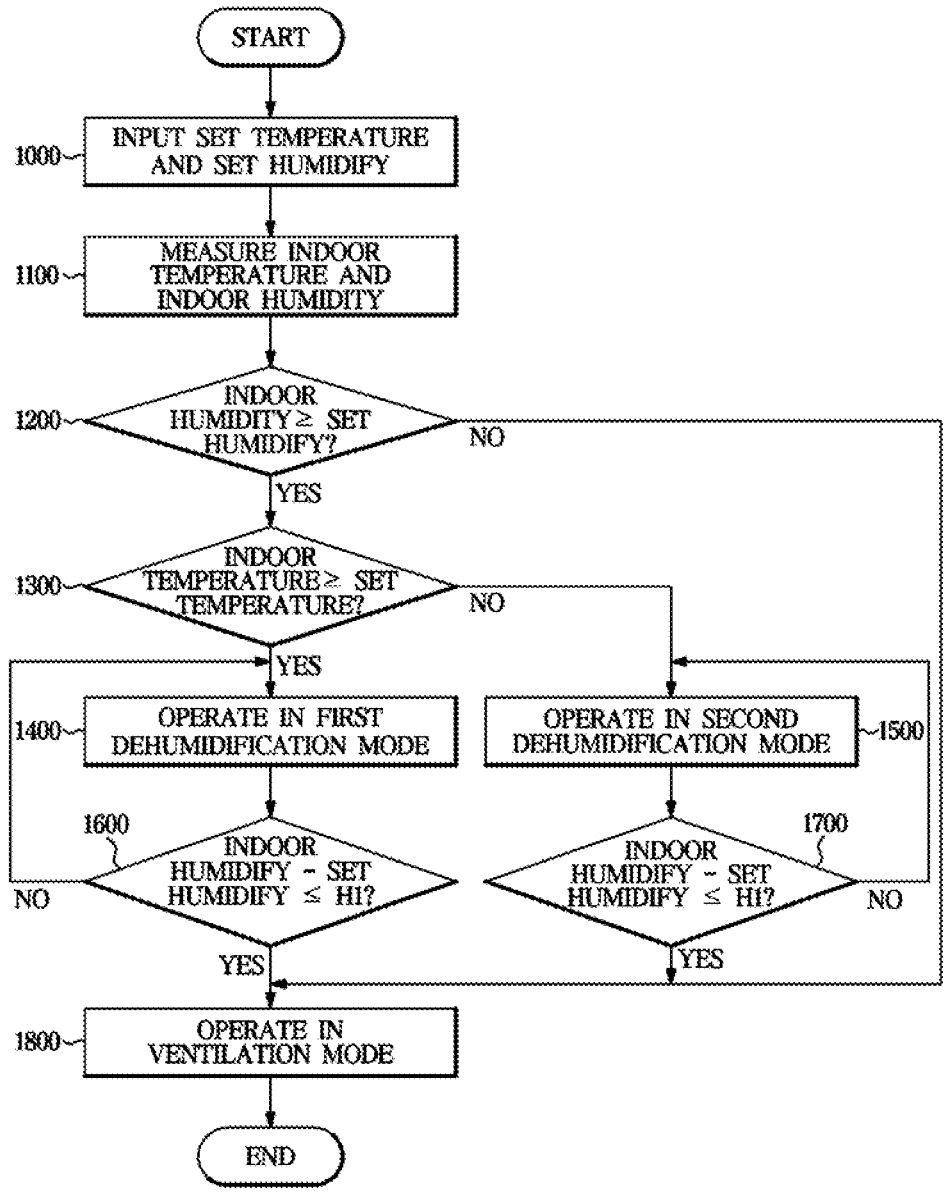
FIG. 6 is a flow chart illustrating a control method of the integrated air conditioning system illustrated in FIG. 3 according to an embodiment of the disclosure.

FIG. 6 is a flow chart illustrating a control method of the integrated air conditioning system illustrated in FIG. 3 according to an embodiment of the disclosure. A control method of the ventilation device illustrated in FIG. 3 and a ventilation system including the ventilation device according to an embodiment will be described with reference to FIG. 6.

The ventilation device 100 may determine whether a set temperature value and a set humidify value are input through the inputter 180 (1000), and in response to determining that the set temperature value and the set humidify value are input, the ventilation device 100 may detect an indoor temperature by using the indoor temperature sensor 140, and may detect an indoor humidity by using the indoor humidity sensor 150 (1100).

The controller 190 may receive an indoor temperature value from the indoor temperature sensor 140 and may receive an indoor humidity value from the indoor humidity sensor 150. Thereafter, the controller 190 may determine the operation mode and switch the operation mode of the integrated air conditioning system 1 based on the indoor temperature, indoor humidity, set temperature, and set humidity.

The controller 190 may determine whether the indoor humidity is greater than the set humidity (1200). In response to the measured indoor humidity being greater than or equal to the input set humidity (hereinafter, referred to as dehumidification mode condition), the controller 190 may determine whether the measured indoor temperature is greater than or equal to the set temperature (1300). That is, in response to the dehumidification mode condition being satisfied, the controller 190 may determine whether the measured indoor temperature is greater than or equal to the set temperature.

In response to the measured indoor humidity being less than the set humidity, the controller 190 may control the integrated air conditioning system 1 to be operated in the ventilation mode (1800). Even while the integrated air conditioning system 1 is operated in the ventilation mode, the controller 190 may detect the indoor temperature and indoor humidity at predetermined time intervals or in real time, and start anew from the operation of determining whether the dehumidification mode condition is satisfied based on the detected values.

In response to the measured indoor temperature being greater than or equal to the input set temperature, the controller 190 may control the integrated air conditioning system 1 to be operated in the first dehumidification mode (1400). In response to the measured indoor temperature being less than the input set temperature, the controller 190 may control the integrated air conditioning system 1 to be operated in the second dehumidification mode (1500).

Even while the integrated air conditioning system 1 is operated in the first dehumidification mode or the second dehumidification mode, the controller 190 may detect the indoor humidity at predetermined time intervals or in real time, and compare the indoor humidity with the set humidity (1600, and 1700). In response to a value, which is obtained by subtracting the set humidity value from a current indoor humidity value measured while being operated in the first dehumidification mode or the second dehumidification mode, exceeding an end humidity value H1, the first dehumidification mode or the second dehumidification mode may be maintained until a value, which is obtained by subtracting the set humidity value from the measured indoor humidity value, is less than or equal to the end humidity value H1. The end humidity value H1 may be set to a value of greater than or equal to −5%, but less than or equal to 0% by applying a sensor error. However, the disclosure is not limited thereto and the end humidity value may be set to another value according to the needs of the user.

In response to the value, which is obtained by subtracting the set humidity value from the current indoor humidity value, being less than or equal to the end humidity value H1, the controller 190 may switch the integrated air conditioning system 1 to the ventilation mode (1800). Even while being operated in the ventilation mode, the controller 190 may detect the indoor temperature and indoor humidity at predetermined time intervals or in real time, and start anew from the operation of determining whether the dehumidification mode condition is satisfied based on the detected values.

However, the disclosure is not limited thereto. The user may select and determine the first dehumidification mode, the second dehumidification mode, or the ventilation mode through the inputter 180. In this case, the controller 190 may control the integrated air conditioning system 1 to be operated in the mode input by the inputter 180 irrespective of the indoor temperature and indoor humidity.

Figure 7:
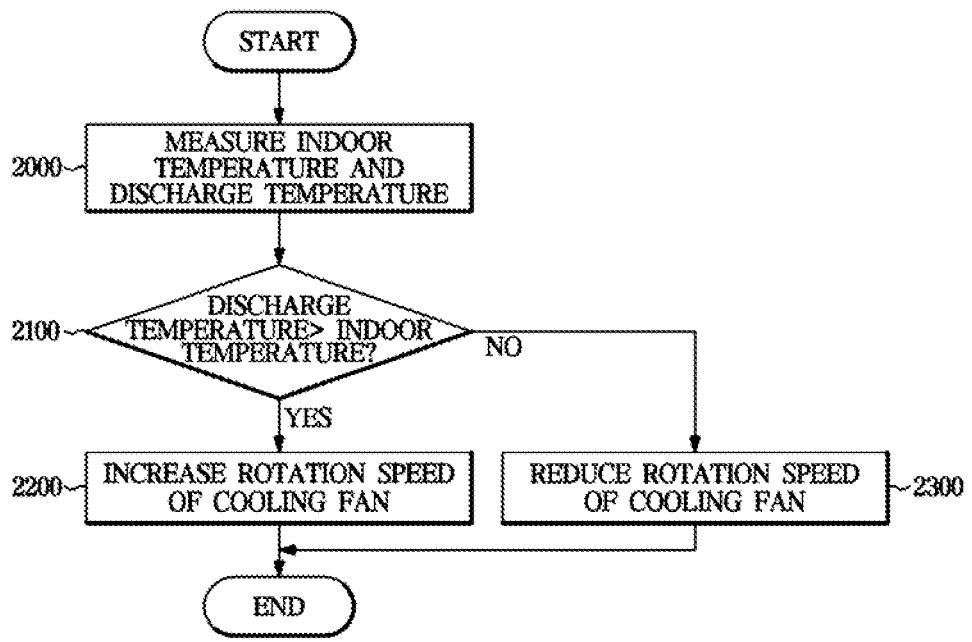
FIG. 7 is a flow chart illustrating a control method of the integrated air conditioning system illustrated in FIG. 3 according to an embodiment of the disclosure.

FIG. 7 is a flow chart illustrating a control method of the integrated air conditioning system illustrated in FIG. 3 according to an embodiment of the disclosure.

A control method of the ventilation device and the ventilation system including the ventilation device illustrated in FIG. 3 according to an embodiment will be described with reference to FIG. 7.

The integrated air conditioning system 1 may be operated in the second dehumidification mode to discharge exhaust airflow, which has the same temperature as the indoor temperature, to the indoor space based on the indoor temperature and the discharge temperature. The controller 190 may control the integrated air conditioning system 1 to be operated in the second dehumidification mode in which the integrated air conditioning system 1 discharges the exhaust airflow having the same temperature as the indoor temperature. That is, the air passing through the second heat exchanger 130 may be heated by the first heat exchanger 120 to have the discharge temperature the same as the indoor temperature.

The ventilation device 100 may detect the indoor temperature using the indoor temperature sensor 140 and detect the discharge temperature, which is the temperature of the exhaust airflow discharged into the indoor space, using the discharge temperature sensor 141 (2000).

The controller 190 may receive an indoor temperature value from the indoor temperature sensor 140 and may receive a discharge temperature from the discharge temperature sensor 141. Thereafter, the controller 190 may adjust the rotation speed of the cooling fan 220a of the outdoor unit 200 based on the indoor temperature and the discharge temperature.

For example, the controller 190 may determine whether the discharge temperature is greater than the indoor temperature (2100). In response to the measured discharge temperature exceeding the measured indoor temperature, the controller 190 may increase the rotation speed of the cooling fan 220a (2200). In other words, in response to the measured discharge temperature exceeding the measured indoor temperature, the controller 190 may allow the cooling fan 220a to rotate at a speed greater than when the measured discharge temperature does not exceed the measured indoor temperature.

As the rotation speed of the cooling fan 220a is increased, the temperature of the refrigerant flowing into the first heat exchanger 120 through the condenser 220 may be reduced, and the discharge temperature of the exhaust airflow, which passes through the first heat exchanger 120 after being heated by the first heat exchanger 120, may also be reduced compared to before the rotation speed of the cooling fan 220a being increased.

In response to the measured discharge temperature being less than or equal to the measured indoor temperature, the controller 190 may decrease the rotation speed of the cooling fan 220a (2300). In other words, in response to the measured discharge temperature being less than or equal to the measured indoor temperature, the controller 190 may allow the cooling fan 220a to rotate at a speed less than when the measured discharge temperature exceeds the measured indoor temperature.

As the rotation speed of the cooling fan 220a is reduced, the temperature of the refrigerant flowing into the first heat exchanger 120 through the condenser 220 may be increased, and the discharge temperature of the exhaust airflow, which passes through the first heat exchanger 120 after being heated by the first heat exchanger 120, may also be increased compared to before the rotation speed of the cooling fan 220a being reduced.

The controller 190 may detect the indoor temperature and the discharge temperature at predetermined time intervals or in real time, and may adjust the rotation speed of the cooling fan 220a at predetermined time intervals or in real time based on the detected values. Accordingly, in response to the temperature of the exhaust airflow being greater than the indoor temperature, the controller 190 may reduce the degree of heating by the first heat exchanger 120 so as to reduce the temperature of the exhaust airflow, and in response to the temperature of the exhaust airflow being less than the indoor temperature, the controller 190 may increase the degree of heating by the first heat exchanger 120 so as to increase the temperature of the exhaust airflow. Therefore, the temperature of the exhaust airflow, which is sucked from outdoors and then discharged to the indoor space, may be maintained at a temperature substantially equal to the temperature of the indoor air.

By a user's manipulation, the integrated air conditioning system 1 illustrated in FIG. 3 may be operated according to the control method according to the embodiment illustrated in FIG. 6, or according to the control method according to the embodiment illustrated in FIG. 7.

Figure 8:
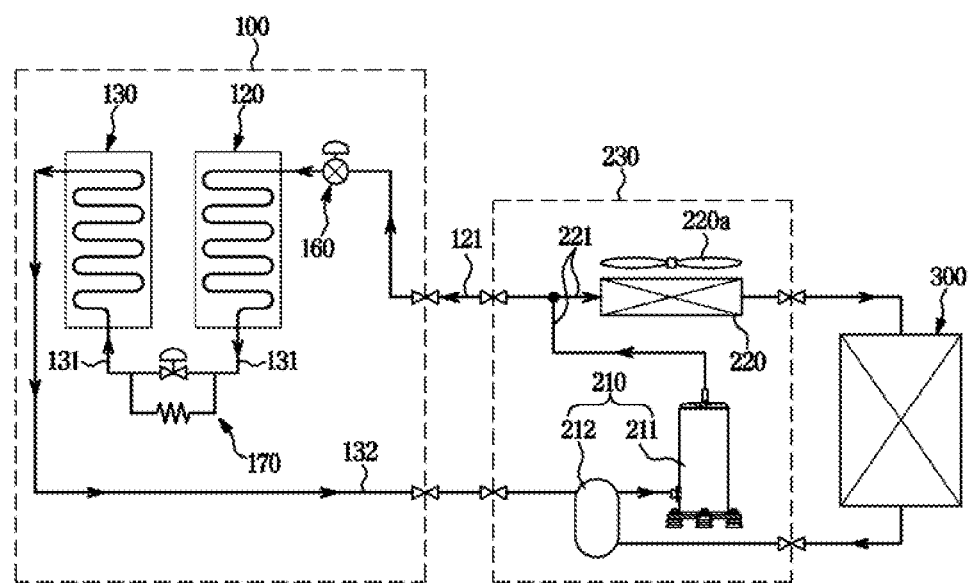
FIG. 8 is a view illustrating a circulation of a refrigerant in the integrated air conditioning system illustrated in FIG. 1.

FIG. 8 is a view illustrating a circulation of a refrigerant in the integrated air conditioning system illustrated in FIG. 1.

Referring to FIG. 8, the first refrigerant pipe 121 may be branched from the refrigerant pipe 221 connecting the condenser 220 of an outdoor unit 230 to the compressor body 211 of the outdoor unit 230. The outdoor unit 230 is the same as the outdoor unit 200 illustrated in FIGS. 3 to 5, but a different reference numeral is used to describe an additional configuration.

The second device 300 may be connected to the outdoor unit 230. The second device 300 may correspond to a separate air conditioning device including an indoor unit of the air conditioner. The second device 300 may receive a refrigerant that is discharged from the compressor 210 and condensed in the condenser 220.

A refrigerant that does not pass through the condenser 220 of the outdoor unit 200 may flow through the first refrigerant pipe 121, and the first refrigerant pipe 121 may transfer a high-temperature and high-pressure refrigerant to the first heat exchanger 120. In this case, the first expansion device 160 may or may not expand the refrigerant to a certain extent. Even when the first expansion device 160 expands the refrigerant, the refrigerant flowing through the first refrigerant pipe 121 is a non-condensed and high-temperature and high-pressure refrigerant, and thus the first heat exchanger 120 may be operated as a condenser configured to heat air while condensing the refrigerant. That is, regardless of the degree of opening of the first expansion device 160, the integrated air conditioning system 1 may be operated in the second dehumidification mode. It should be understood that the integrated air conditioning system 1 may be operated in the ventilation mode.

However, the disclosure is not limited thereto. A separate condenser may be provided on the first refrigerant pipe 121. The refrigerant flowing through the first refrigerant pipe 121 may pass through the condenser provided on the first refrigerant pipe 121 and be introduced into the first expansion device 160 in a condensed state, and the integrated air conditioning system 1 may be operated in the first dehumidification mode or the second dehumidification mode. It should be understood that the integrated air conditioning system 1 may be operated in the ventilation mode.

The refrigerant, which is condensed by passing through the first heat exchanger 120, may be expanded by the second expansion device 170, and the second heat exchanger 130 may evaporate the refrigerant to condense moisture in the air, thereby dehumidifying the refrigerant. As described above, the ventilation device 100 and the integrated air conditioning system 1 illustrated in FIG. 5 may simultaneously operate the ventilation device 100 and the integrated air conditioning system 1 by using one outdoor unit 230.

Figure 9:
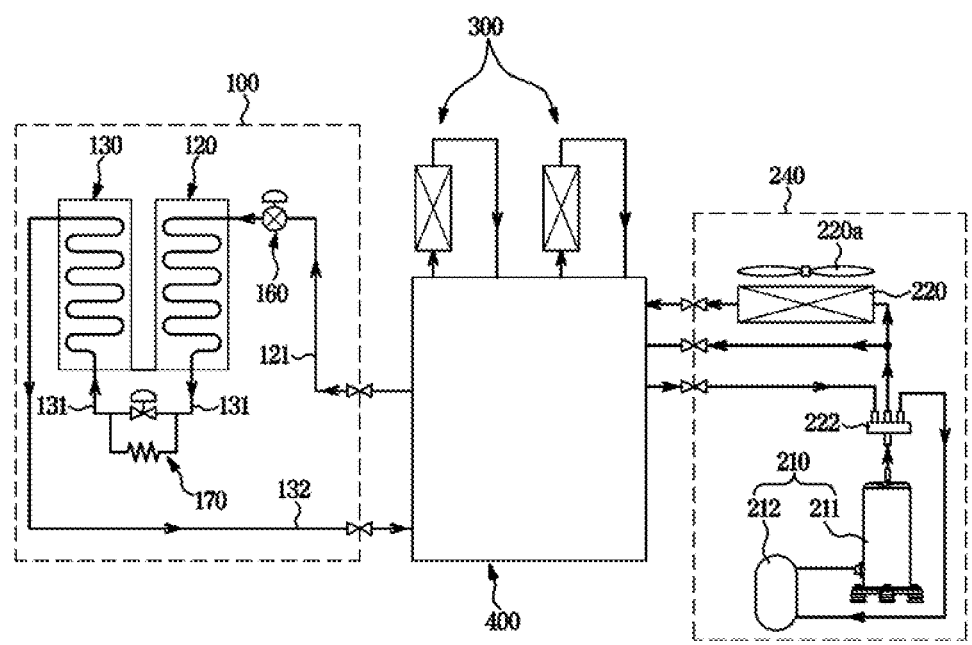
FIG. 9 is a view illustrating a circulation of a refrigerant in an integrated air conditioning system according to an embodiment of the disclosure.

FIG. 9 is a view illustrating a circulation of a refrigerant in an integrated air conditioning system according to an embodiment of the disclosure. Descriptions of parts which are the same as those described above will be omitted.

Referring to FIG. 9, an integrated air conditioning system 1 may further include a refrigerant distributor 400 configured to relay the ventilation device 100 and an outdoor unit 240, and at least one second device 300 configured to receive a refrigerant from the outdoor unit 240 through the refrigerant distributor 400. The second device 300 may correspond to an indoor unit of an air conditioner. The refrigerant distributor 400 may receive the refrigerant from the outdoor unit 240, and distribute the refrigerant to the at least one the indoor unit 300 and the ventilation device 100 in accordance with a load of each indoor unit 300 and the ventilation device 100. The refrigerant distributor 400 may include a heat recovery cycle. The refrigerant distributor 400 is well known and used in the art, and a person skilled in the art can easily provide the refrigerant distributor 400 and connect the indoor unit 300 and the ventilation device 100 to the refrigerant distributor.

The outdoor unit 240 connectable to the refrigerant distributor 400 may include the compressor 210, a flow path switching valve 222, and the condenser 220, but is not limited thereto. Accordingly, in order to be connected to the refrigerant distributor 400, the outdoor unit 240 may be changed or configurations thereof may be modified.

The ventilation device 100 may be connected to the refrigerant distributor 400. The ventilation device 100 may be connected to the outdoor unit 240 through the refrigerant distributor 400, and may receive the refrigerant from the outdoor unit 240 through the refrigerant distributor 400. The first refrigerant pipe 121 and the third refrigerant pipe 132 may be connected to the refrigerant distributor 400.

The refrigerant condensed in the condenser 220 may be supplied to the ventilation device 100 through the first refrigerant pipe 121. The ventilation system 100 may be operated in the first dehumidification mode, the second dehumidification mode, or the ventilation mode depending on whether the first expansion device 160 and/or the second expansion device 170 expand the refrigerant. Accordingly, the integrated air conditioning system 1 may operate the plurality of indoor units 300 and the ventilation device 100 using the single outdoor unit 240.

By a user's manipulation, the integrated air conditioning system 1 illustrated in FIG. 6, and the integrated air conditioning system 1 illustrated in FIG. 7 may be operated according to the control method according to the embodiment illustrated in FIG. 4, or the control method according to an embodiment illustrated in FIG. 5.

As mentioned above, the integrated air conditioning system 1 may be operated in the cooling and heating system state in which the second device 300 configured to serve as an indoor unit is operated to provide an appropriate temperature of the indoor space I, the integrated air conditioning system state in which the second device 300 and the ventilation device 100 are simultaneously operated to provide an appropriate temperature of the indoor space I and at the same time, to perform ventilation and dehumidification of the indoor air and to improve an air cleanliness, and the ventilation system state in which only the ventilation device 100 is operated to perform ventilation and dehumidification of the indoor air and to improve an air cleanliness.

The controller 190 may receive a state of indoor air through each of the above-described sensors and selectively operate the ventilation device 100, the outdoor unit 200, and the second device 300 according to the state of the indoor air, and allow the integrated air conditioning system 1 to be operated in each state. Alternatively, by a user input, the integrated air conditioning system 1 may be operated in each state.

As an example, in response to a temperature of the indoor air, which is measured by each sensor, being greater than the set temperature, the controller 190 may control the integrated air conditioning system 1 to be operated in the cooling and heating system state in which only the second device 300 is operated.

Further, in response to a temperature and humidity of the indoor air, which is measured by each sensor, being greater than the set value, the controller 190 may control the integrated air conditioning system 1 to be operated in the integrated air conditioning system state in which both of the second device 300 and the ventilation device 100 are operated.

Further, in response to humidity of the indoor air, which is measured by each sensor, being greater than the set humidity, the controller 190 may control the integrated air conditioning system 1 to be operated in the ventilation system state in which only the ventilation device 100 is operated.

Even in the ventilation system state of the integrated air conditioning system 1, the ventilation device 100 may be operated to supply an appropriate temperature to the indoor space through the first and second dehumidification modes according to a predetermined temperature difference, but is not limited thereto. Even when the integrated air conditioning system 1 is operated in the integrated air conditioning system state, the ventilation device 100 may be operated in one mode that is selected between the first and second dehumidification modes according to a temperature value input through each sensor.

In addition, in response to a pollution level of the indoor air, which is measured through each sensor, being greater than a set pollution level, the controller 190 may control the integrated air conditioning system 1 to be operated in the ventilation system state in which only the ventilation device 100 is operated.

In this case, the ventilation device 100 may be operated in the ventilation mode, but is not limited thereto, and may be operated in the first and second dehumidification modes according to the values of temperature and humidity input through each sensor.

As described above, it is possible to provide an appropriate temperature to the indoor space I only by the configuration of the ventilation device 100. Therefore, when only the ventilation device 100 is operated in the ventilation system state of the integrated air conditioning system 1, it is possible to provide an appropriate temperature at a predetermined level to the indoor space I and it is possible to dehumidify and purify the indoor air at a predetermined level through the second device 300. Accordingly, the integrated air conditioning system 1 operated in any state may provide fresh air to a user in the indoor space I. Hereinafter an example configuration of the ventilation device 100 of the integrated air conditioning system 1 according to the disclosure will be described.

Figure 10:
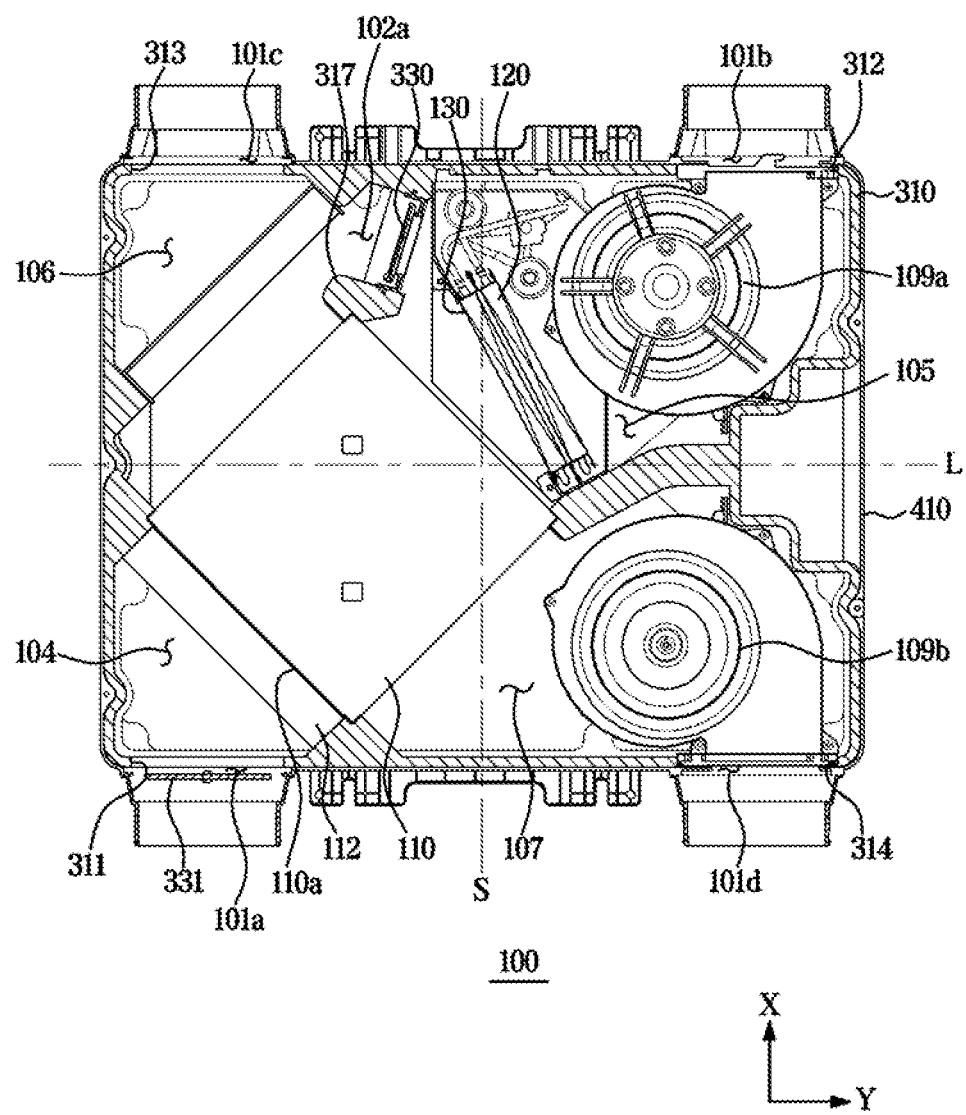
FIG. 10 is a view illustrating the ventilation device illustrated in FIG. 1, particularly, illustrating a state in which some components of the ventilation device is removed when viewed from top to bottom.
Figure 11:
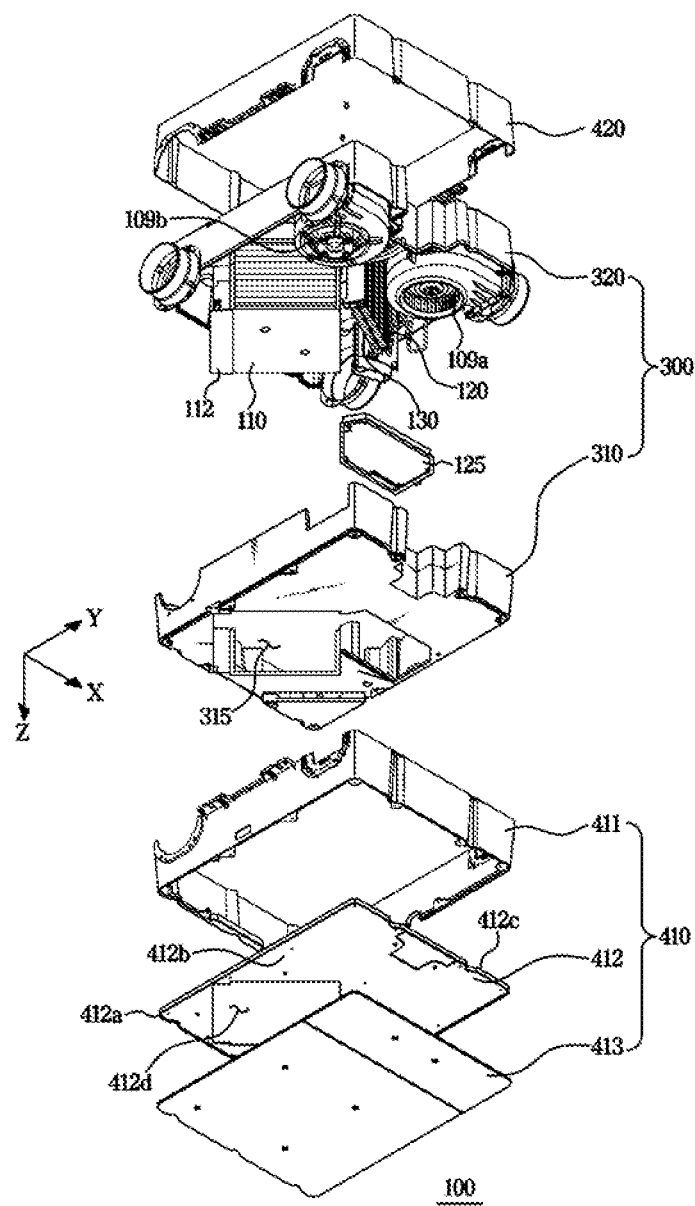
FIG. 11 is an exploded perspective view illustrating the ventilation device illustrated in FIG. 10.
Figure 12:
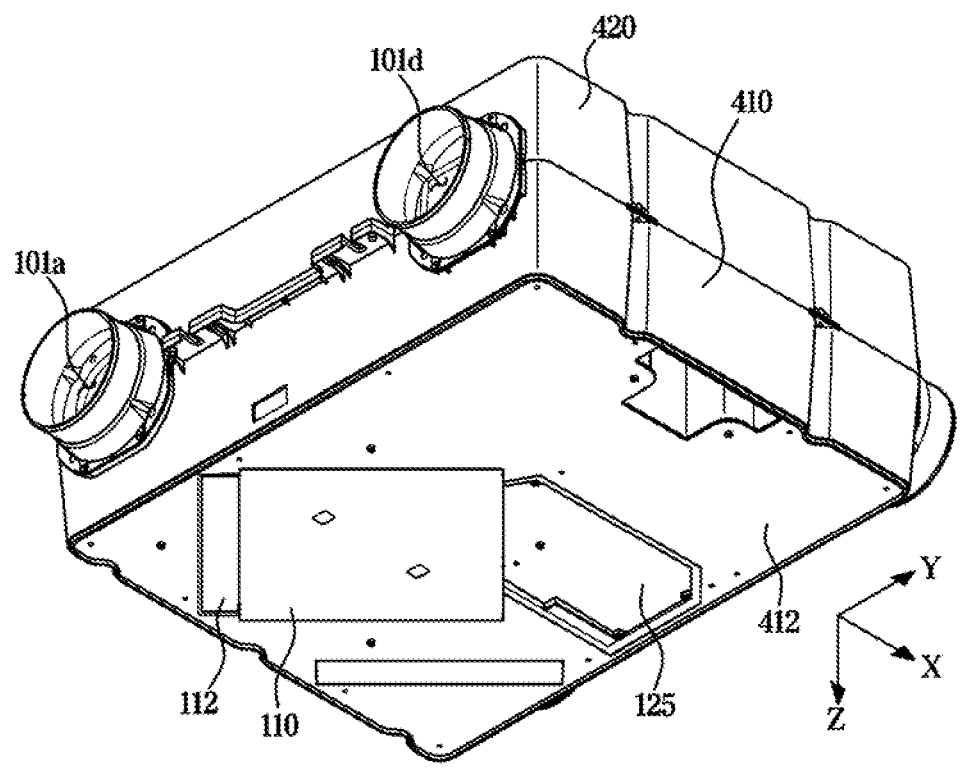
FIG. 12 is a view illustrating the state in which some components of the ventilation device is removed when viewed from bottom to top.
Figure 13:
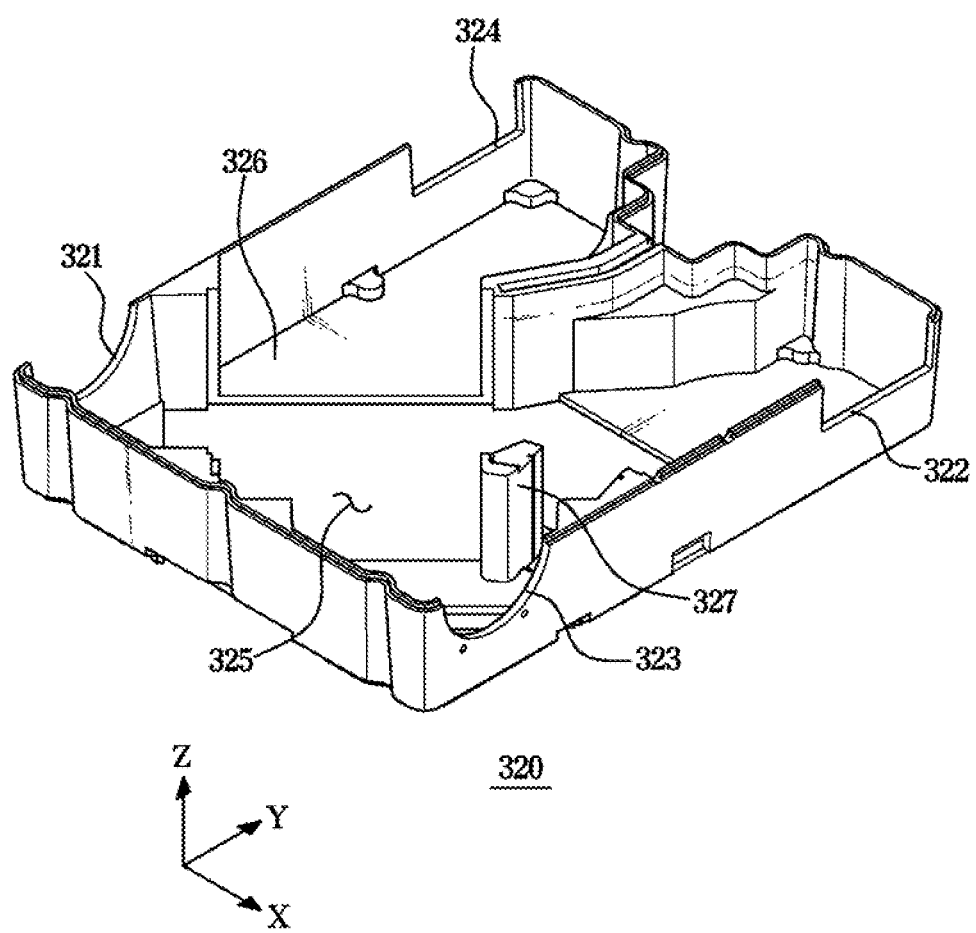
FIG. 13 is a perspective view illustrating a second housing of the ventilation device illustrated in FIG. 10.
Figure 14:
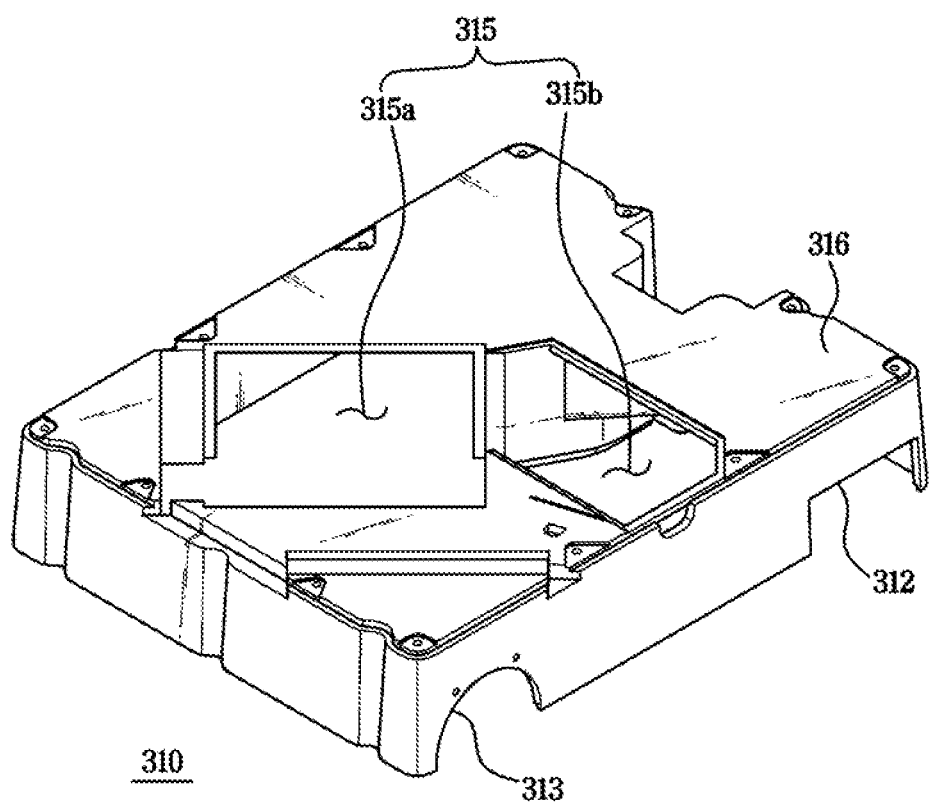
FIG. 14 is a perspective view illustrating a first housing of the ventilation device illustrated in FIG. 10.

FIG. 10 is a view illustrating the ventilation device illustrated in FIG. 1, particularly, illustrating a state in which some components of the ventilation device are removed when viewed from top to bottom, FIG. 11 is an exploded perspective view illustrating the ventilation device illustrated in FIG. 10, FIG. 12 is a view illustrating the state in which some components of the ventilation device are removed when viewed from bottom to top, FIG. 13 is a perspective view illustrating a second housing of the ventilation device illustrated in FIG. 10, and FIG. 14 is a perspective view illustrating a first housing of the ventilation device illustrated in FIG. 10.

The ventilation device 100 may include a filter 112 provided to remove foreign substances flowing in the outdoor air.

The filter 112 may be provided to collect foreign substances of a predetermined size. The filter 112 may be a High Efficiency Particulate Air (HEPA) filter that collects fine dust of a predetermined size. HEPA filters may be formed of glass fibers. However, the disclosure is not limited thereto, and the filter 112 may be provided with various types of filters that collects foreign substances.

In addition, the filter 112 is not limited thereto, and may be provided as a photocatalytic filter that induces chemical action of air using a photocatalyst. That is, the filter 112 may include a photocatalyst and be provided to sterilize various pathogens and bacteria present in the air by inducing a chemical reaction by the light energy of the photocatalyst. Acceleration of chemical action may cause decomposition, removal, or capture of odor particles in the air.

Although not illustrated in the drawings, a pre-filter for collecting foreign substances of a predetermined size or more in the air may be additionally provided.

The filter 112 may be arranged adjacent to the total heat exchanger 110. For example, the total heat exchanger 110 may include an intake air inlet end 110a through which outdoor air on the inlet flow path 102 is introduced, and the filter 112 may be arranged to face the intake air inlet end 110a of the total heat exchanger 110.

It is appropriate that the filter 112 may be arranged to closely face the intake air inlet end 110a. Accordingly, foreign substances flowing in the outdoor air introduced through the first inlet 101a are collected by the filter 112 before the outdoor air flows into the total heat exchanger 110, thereby preventing the total heat exchanger 110 from being contaminated.

The ventilation device 100 may include a drain tray 125 provided to collect condensed water generated in the first and second heat exchangers 120 and 130. The drain tray 125 may be disposed below the first and second heat exchangers 120 and 130 in an up and down direction Z.

The housing 101 may include an inner housing 350 including a first inner housing 310 and a second inner housing 320 provided to be coupled to the first inner housing 310 in the up and down direction Z.

The housing 101 may include covers 410 and 420 provided to form the exterior of the housing 101 and provided to cover the first and second inner housings 310 and 320. The covers 410 and 420 may include a first cover 410 arranged in the lower side with respect the up and down direction Z, and a second cover 420 arranged above the first cover 410 and coupled to the first cover 420 in the up and down direction Z.

The first and second inner housings 310 and 320 may be formed of an insulating material. It is appropriate that the first and second inner housings 310 and 320 may be formed of an expanded polystyrene (EPS) insulation material such as Styrofoam. However, the disclosure is not limited thereto, and the first and second inner housings 310 and 320 may be formed of various insulating materials that maintains a temperature of air flowing on the inlet flow path 102 and the outlet flow path 103 at a predetermined temperature.

The covers 410 and 420 may be provided to cover the first and second inner housings 310 and 320 formed of an insulating material to protect the first and second inner housings 310 and 320 from the outside. The covers 410 and 420 may be formed of an injection product such as plastic.

According to an embodiment of the disclosure, components are referred to as the first and second inner housings 310 and 320 and the cover 410 and 420, but the first and second inner housings 310 and 320 may be referred to as first and second insulation materials 310 and 320, and the first and second covers 410 and 420 may be referred to as first and second housings 410 and 420. However, in the following, the first and second inner housings 310 and 320 and the covers 410 and 420 will be described with the above-described configuration names.

When the ventilation device 100 is installed in a plurality of indoor spaces such as a multiplex-housing or an apartment, the indoor space may be provided as a pair of indoor spaces in a symmetrical shape.

The pair of indoor spaces may be formed mirror-symmetrically in a left and right direction Y based on the direction in which outdoor air is discharged into the indoor space (refer to FIG. 2).

That is, the ventilation device 100 may be installed in the indoor space I, and the pipes P1 and P2 formed in the indoor space I may be connected to the first outlet 101*b* and the second inlet 101*c* of the ventilation device 100, and each pipe P1 and P2 may extend to each region Ia, Ib, Ic, and Id. Therefore, the ventilation device 100 may ventilate each region Ia, Ib, Ic, and Id.

In this case, the structure of the pipes P1 and P2 arranged in the indoor spaces I1 and I2 may also be provided to be symmetrical in the left and right direction Y.

Accordingly, it is required that the ventilation devices 100 are provided in different types 100A and 100B so as to be connected to the pipes P1 and P2 of each indoor space I.

Accordingly, an air conditioning facility formed on each indoor space may also be provided to be symmetrical in the left and right direction Y. In this case, when the ventilation device 100 in the same shape is disposed in each indoor space, the first and second inlets 101*a* and 101*c* and the first and second outlets 101*b* and 101*d* are arranged to be opposite in the left and right direction Y, and thus it may be impossible to be installed symmetrically in the pair of indoor spaces.

Accordingly, in the case of a known ventilation device, the upper and lower surfaces of the housing are installed upside down in the left and right direction Y, and thus the ventilation device is installed in a pair of indoor spaces, respectively.

However, the ventilation device 100 according to an embodiment of the disclosure may include first and second heat exchangers 120 and 130 for the dehumidification of the indoor space as well as the ventilation of the indoor space. In this case, a user needs to periodically take out the drain tray 125 from the ventilation device 100 to clean the drain tray 125.

Further, the user needs to take out the total heat exchanger 110 and the filter 112 from the ventilation device 100 to periodically remove the foreign substances collected in the total heat exchanger 110 and the filter 112.

In the ventilation device 100, a withdrawal hole provided to withdraw the drain tray 125, the total heat exchanger 110, and the filter 112 may be provided in the housing 101 and the covers 410 and 420, respectively, and thus the drain tray 125, the total heat exchanger 110, and the filter 112 may be withdrawn through the withdrawal hole.

In this case, if the ventilation device 100 is simply installed in such a way that the upper and lower surfaces of the housing are installed upside down in the left and right direction Y, it may be difficult to withdraw the drain tray 125, the total heat exchanger 110, and the filter 112.

That is, when the ventilation device 100 is turned over in the left and right direction Y, the positions of the drain tray 125, the total heat exchanger 110 and the filter 112 are inverted in the up and down direction Z and thus the positions thereof may not correspond to the position of the withdrawal hole with respect to the up and down direction Z. Therefore, it is difficult to withdraw the drain tray 125, the total heat exchanger 110, and the filter 112.

In order to prevent this, it is required that a pair of ventilation devices 100 are manufactured in a type corresponding to each indoor space or an air conditioning facility of each indoor space is formed differently, which increases the manufacturing cost or makes the ventilation device 100 inefficiently installed in the indoor space.

Because the known ventilation device does not include the heat exchangers 120 and 130, the known ventilation device may be turned over in the left and right direction Y and then installed regardless of the withdrawal of the drain tray 125.

Further, as for the known ventilation device, the total heat exchanger 110 and the filter 112 may be provided to be withdrawn from the ventilation device 100. In the case of the known ventilation device, the total heat exchanger 110 and the filter 112 may be arranged to be symmetrical in the left and right direction Y or a front and rear direction X with respect to any one central axis between a long central axis L, which extends in parallel to a long side of the housing 101, and a short central axis S that extends in parallel to a short side of the housing 101.

However, unlike an embodiment of the disclosure, the short side of the housing 101 may extend in the left and right direction Y and the long side may extend in the front and rear direction X. Accordingly, a direction, in which the long central axis L extends, may be different from a direction, in which the short central axis S extends.

Further, in order that the total heat exchanger 110 and the filter 112 are withdrawn from the ventilation device from opposite sides with respect to the up and down direction Z, a withdrawal hole corresponding to an upper end and a lower end in the up and down direction Z is formed in the first and second housings 310 and 320 and the covers 410 and 420.

Accordingly, even when the ventilation device 100 is turned over in the left and right direction Y and then installed, the total heat exchanger 110 and the filter 112 may be withdrawn from the known ventilation device in any direction in the up and down direction Z through the withdrawal hole in the upper end or the withdrawal hole in the lower end.

However, as for the ventilation device 100 according to an embodiment of the disclosure, the first and second heat exchangers 120 and 130 are arranged inside the first and second inner housings 310 and 320, and thus it is difficult to arrange the first and second heat exchangers 120 and 130 as well as the total heat exchanger 110 and the filter 112, to be symmetrical with respect to any one of the central axes L and S.

That is, it is required that the first and second heat exchangers 120 and 130, the total heat exchanger 110 and the filter 112 are all arranged inside the housing 101, and thus when the first and second heat exchangers 120 and 130, the total heat exchanger 110 and the filter 112 are installed in the left and right direction Y or the front and rear direction X with respect to one of the central axis L and S, the size of the ventilation device 100 is greater than that of the known ventilation device. Accordingly, it is difficult to install the ventilation device 100 in the indoor space I, and an area of the inlet flow path 102 and the outlet flow path 103 may be increased due to the large size of the ventilation device 100, which may cause a decrease in the efficiency.

In the ventilation device 100 according to the disclosure, in order to prevent such a difficulty, the first inner housing 310 may include a first hole 315 provided to form one surface 316 of the housing 101, and formed asymmetrically on the one surface 316 with respect to central lines L and S of the one surface 316 extending in a long side direction or in a short side direction of the one surface 316, and provided to allow the drain tray 125, the total heat exchanger 110 and the filter 112 to be withdrawn out of the housing 101 to the outside.

Further, the second inner housing 320 may include a second hole 325 provided to form other surface 326 of the housing, and arranged on the other surface 326 and formed to have a shape corresponding to the first hole 315 in the up and down direction Z.

As mentioned above, one of the first inner housing 310 and the second inner housing 320 may be selectively covered by the first cover 410, and the other of the first inner housing 310 and the second inner housing 320 may be covered by the second cover 420.

That is, the first cover 410 and the second cover 420 may be respectively arranged to form a fixed lower portion and a fixed upper portion of the ventilation device 100, and one of the first inner housing 310 and the second inner housing 320 may be selectively inserted into the first cover 410 forming the lower portion of the ventilation device 100, and the other of the first inner housing 310 and the second inner housing 320 may be inserted into the second cover 420.

Accordingly, the first inner housing 310 may be inserted into the first cover 410 and arranged in the lower portion of the ventilation device 100, and in some cases, the second inner housing 320 may be inserted into the first cover 410 and arranged in the lower portion of the ventilation device 100.

When it is assumed that the ventilation device 100 disposed on the left side is defined as a first type and the ventilation device 100 disposed on the right side in the left and right direction Y is a second type, the ventilation device 100 according to an embodiment of the disclosure may implement both the first type ventilation device and the second type ventilation device by changing the positions of the first inner housing 310 and the second inner housing 320 in the up and down direction Z. However, the ventilation device 100 in which the first inner housing 310 is inserted into the first cover 410 and disposed in the lower portion of the ventilation device 100, as illustrated in FIG. 8 will be described as an example.

The internal components of the housing 101, such as the blowers 109a and 109b, the first and second heat exchangers 120 and 130, the total heat exchanger 110, and the filter 112, are mounted based on an internal shape of the first inner housing 310. As will be described later, the drain tray 125, the total heat exchanger 110, and the filter 112 may be disposed to correspond to the first hole 315 of the first inner housing 310.

In the case of the opposite type of ventilation device 100, the second inner housing 320 may be provided to form the lower portion of the housing 101 in the up and down direction Z and be inserted into the first cover 410. Accordingly, the first inner housing 310 may be provided to be disposed above the second inner housing 320 in the up and down direction Z.

The internal components of the housing 101, such as the blowers 109a and 109b, the first and second heat exchangers 120 and 130, the total heat exchanger 110, and the filter 112, are mounted based on an internal shape of the second inner housing 320. In this case, the drain tray 125, the total heat exchanger 110, and the filter 112 may be disposed to correspond to the second hole 325 of the second inner housing 320.

That is, by simply changing only the positions of the first and second inner housings 310 and 320 in the up and down direction Z, it is possible to form the first and second types of the ventilation devices.

As illustrated in FIG. 11, in the ventilation device 100, the second cover 420 provided to form the upper portion of the ventilation device 100, the second inner housing 320 provided to be inserted into the second cover 420, the first inner housing 310 coupled to the second inner housing 320 from the lower side in the up and down direction Z, and the first cover 410 provided to form the lower portion of the ventilation device 100 and provided to cover the first inner housing 310 may be arranged in order.

The internal components of the housing 101, such as the blowers 109a and 109b, the first and second heat exchangers 120 and 130, the total heat exchanger 110, and the filter 112, may be arranged to be supported by the first inner housing 310 or the second inner housing 320. However, the drain tray 125, the total heat exchanger 110, and the filter 112 may be supported to be withdrawable downward of the ventilation device 100 through the first hole 315 of the first inner housing 310.

As mentioned above, the first and second inner housing 310 and 320 may be assembled with each other by changing the position thereof in the up and down direction Z, but the first and second covers 410 and 420 may be arranged in the same position regardless of the types of the ventilation device 100. The second cover 420 may always form the upper portion of the ventilation device 100, and the first cover 410 may always form the lower portion of the ventilation device 100.

The first cover 410 may include a body portion 411 formed in a rectangular frame shape, a surface portion 412 formed in a plate shape and removably coupled to the body portion 411, and a lower cover portion 413 provided to cover the surface portion 412 from the lower side.

Unlike the second cover 420, the first cover 410 may be provided to communicate with one inner housing, which is mounted to the first cover 410, between the first and second inner housings 310 and 320 so as to allow the drain tray 125, the total heat exchanger 110, and the filter 112 to be withdrawn toward the outside of the ventilation device 100.

For example, the surface portion 412 may include a third hole 412d provided to correspond to the first hole 315 of the first inner housing 310.

The surface portion 412 may include a plate body 412a, a first surface 412b of the plate body 412a, and a second surface 412c disposed on an opposite side of the first surface 412b.

The third hole 412d may be formed on the plate body 412a. As described above, the third hole 412d may be provided to correspond to the first hole 315, and thus on the plate body 412a, the third hole 412d may be provided asymmetrically with respect to any one of a long central axis L and a short central axis S of the housing 101.

In the first type of ventilation device 100, the surface portion 412 may be coupled to the body portion 411 such that the first surface 412b faces downward. When the surface portion 412 is coupled to the body portion 411 such that the first surface 412b faces downward, the third hole 412d may correspond to the first hole 315 of the first inner housing 310 in the up and down direction Z.

The first hole 315 and the third hole 412d may have substantially the same shape and may be overlapped in the up and down direction Z.

Conversely, the surface portion 412 may be coupled to the body portion 411 such that the second surface 412c faces downward. In this case, because the surface portion 412 is inverted, the third hole 412d may be disposed in an inverted shape with respect to when the surface portion 412 is coupled to the body portion 411 such that the first surface 412b faces downward.

As illustrated in FIG. 12, when the lower cover portion 413 is removed from the first cover 410, the drain tray 125, the total heat exchanger 110, and the filter 112 may be exposed in the lower side of the ventilation device 100.

A user can withdraw the drain tray 125, the total heat exchanger 110, and the filter 112 downward from the ventilation device 100 as needed.

As illustrated in FIGS. 13 and 14, an outer structure of the first inner housing 310 and second inner housing 320 may be the same. As described above, the first inner housing 310 or the second inner housing 320 may be selectively inserted into the first cover 410, and thus in order that the first inner housing 310 or the second inner housing 320 is inserted into and supported by the first cover 410, the outer shape of each of the first and second inner housings 310 and 320 may be the same.

Conversely, the first inner housing 310 or the second inner housing 320 may be selectively inserted into the second cover 420, and thus in order that the first inner housing 310 or the second inner housing 320 is inserted into and supported by the second cover 420, the outer shape of each of the first and second inner housings 310 and 320 may be the same.

The first inner housing 310 may include a first inlet forming portion 311 forming a part of the first inlet 101a, a first outlet forming portion 312 forming a part of the first outlet 101b, a second inlet forming portion 313 forming a part of the second inlet 101c, and a second outlet forming portion 314 forming a part of the second outlet 101d.

The first outlet forming portion 312 and the second outlet forming portion 314 may be provided to be symmetrical with respect to the long central axis L. In addition, the first inlet forming portion 311 and the second inlet forming portion 313 may be provided to be symmetrical with respect to the long central axis L.

This is in order to maintain the same shape even when the first inner housing 310 is disposed to be reversed in the left and right direction Y.

For example, when the first type of ventilation device 100 is provided, the first outlet forming portion 312 may be disposed on the right side of the ventilation device 100 in the left and right direction Y, but when the second type of ventilation device 100 is provided, the first outlet forming portion 312 may be disposed on the left side of the ventilation device 100 in the left and right direction Y.

Similarly, the second inner housing 320 may include a first inlet forming portion 321 forming a part of the first inlet 101a, a first outlet forming portion 322 forming a part of the first outlet 101b, a second inlet forming portion 323 forming a part of the second inlet 101c, and a second outlet forming portion 324 forming a part of the second outlet 101d.

The first outlet forming portion 322 and the second outlet forming portion 324 may be provided to be symmetrical with respect to the long central axis L. In addition, the first inlet forming portion 321 and the second inlet forming portion 323 may be provided to be symmetrical with respect to the long central axis L.

The first outlet forming portion 312 of the first inner housing 310, and the first outlet forming portion 322 of the second inner housing 320 may be formed to correspond to each other in the up and down direction Z. The first inlet forming portion 311 of the first inner housing 310 and the first inlet forming portion 321 of the second inner housing 320 may be formed to correspond to each other in the up and down direction Z. The second outlet forming portion 314 of the first inner housing 310, and the second outlet forming portion 324 of the second inner housing 320 may be formed to correspond to each other in the up and down direction Z. The second inlet forming portion 313 of the first inner housing 310 and the second inlet forming portion 323 of the second inner housing 320 may be formed to correspond to each other in the up and down direction Z.

This is in order to allow the first and second outlets 101b and 101d and the first and second inlets 101a and 101c to have the same shape even when the first inner housing 310 and the second inner housing 320 are disposed to be inverted in the up and down direction Z and assembled.

The first inner housing 310 and the second inner housing 320 may respectively include a partition provided to define the first and second inlet chambers 104 and 105 and the first and second outlet chambers 106 and 107 in the housing 101. Each partition may be coupled to each other to form the partition wall 108.

Each partition may correspond to each other in the up and down direction Z.

As mentioned above, the first and second heat exchangers 120 and 130 may be arranged in the second inlet chamber 105. Accordingly, the second inlet chamber 105 may be provided to have an area greater than an area of the first inlet chamber 104 and the first and second outlet chambers 106 and 107.

The first and second inlet chambers 104 and 105 and the first and second outlet chambers 106 and 107 may be composed of a space partitioned by the one surface 316 of the housing 101 formed in the first inner housing 310, the other surface 326 of the housing 101 formed in the second inner housing 320, and the partition wall 108 formed by the partition of the first and second inner housings 310 and 320. The first and second inlet chambers 104 and 105 and the first and second outlet chambers 106 and 107 may communicate with each other through the total heat exchanger 110.

The total heat exchanger 110 may be provided in a square shape. This is to allow heat exchange to be performed between the outdoor air and the indoor air in the same amount that flows in the total heat exchanger 110.

The first hole 315, through which the total heat exchanger 110, the filter 112, and the drain tray 125 are drawn out, may be divided into a first region 315a through which the total heat exchanger 110 and the filter 112 are drawn out, and a second region 315b through which the drain tray 125 is drawn out.

According to an embodiment of the disclosure, the first region 315a and the second region 315b may be provided in a shape connected to each other, but the disclosure is not limited thereto. Therefore, the first region 315a and the second region 315b may be provided to be separated from each other.

The first region 315a may have a substantially rectangular shape. This is because the total heat exchanger 110 is provided to have a square cross section, and the filter 112 is disposed adjacent to the intake air inlet end 110a of the total heat exchanger 110 as described above.

Therefore, in order to expose both the total heat exchanger 110 and the filter 112 to the outside, the first region 315a may be provided in a rectangular shape.

The second region 315b may be provided in a shape corresponding to the cross-section of the drain tray 125. The shape of the cross-section of the second region 315b is not limited to one shape and may be formed in various ways.

When a side on which the first inlet 101a and the second outlet 101d are arranged in the front and rear direction X is defined as one side, and a side on which the second inlet 101c and the first outlet 101b are arranged in the front and rear direction X is defined as the other side, the total heat exchanger 110 may be disposed adjacent to the one side of the housing 101 with respect to the long central axis L. For example, the total heat exchanger 110 may be closest to the first inlet 101a.

This is to maximize the area of the second inlet chamber 105 in the limited internal space of the housing 101 as the first and second heat exchangers 120 and 130 are disposed adjacent to the first outlet 101b.

Accordingly, in the first inner housing 310, the first region 315a of the first hole 315 may be disposed most adjacent to the first outlet forming portion 312 of the first inner housing 310 with respect to the long central axis L, so as to correspond to the total heat exchanger 110.

Accordingly, the first hole 315 may be formed asymmetrically with respect to the long central axis L or the short central axis S on the one surface 316 of the first inner housing 310.

When the one surface 316 of the first inner housing 310 and the other surface 326 of the second inner housing 320 are disposed in parallel to the long central axis L or the short central axis S on the same surface, the first hole 315 of the first inner housing 310 and the second hole 325 of the second inner housing 320 may be provided in a mirror-symmetrical shape with respect to a center line between the first inner housing 310 and the second inner housing 320.

Further, the partition of the first inner housing 310 and the partition of the second inner housing 320 may be also provided in a mirror-symmetrical shape with respect to the center line between the first inner housing 310 and the second inner housing 320.

Accordingly, even when the ventilation device 100 is formed in such a way that the first inner housing 310 and the second inner housing 320 are inverted in the up and down direction Z, the first type of the ventilation device and the second type of the ventilation device may be arranged symmetrically in the left and right direction Y.

Further, the housing 101 may include a connection flow path 102a provided to connect at least a portion of the inlet flow path 102 and the outlet flow path 103.

For example, the connection flow path 102a may be disposed on the partition wall 108 arranged between the first outlet chamber 105 and the second inlet chamber 106 and provided to define the first outlet chamber 105 and the second inlet chamber 106.

The partition wall 108 provided to define the first outlet chamber 105 and the second inlet chamber 106 may be formed with a partition wall forming portion 317 of the first inner housing 310 and a partition wall forming portion 327 of the second inner housing 320. The connection flow path 102a may be formed by cutting at least a portion of the partition wall.

Accordingly, the first outlet chamber 106 and the second inlet chamber 105 may be provided to communicate with each other.

The ventilation device 100 may include a connection flow path opening/closing unit 330 disposed on the connection flow path 102a and configured to open and close the connection flow path 102a.

The connection flow path opening/closing unit 330 may selectively open and close the connection flow path 102a to allow the first outlet chamber 106 and the second inlet chamber 105 to selectively communicate with each other.

The ventilation device 100 may include a first inlet opening/closing unit 331 disposed on the first inlet 101a and configured to selectively open and close the first inlet 101a.

As described above, the ventilation device 100 may be operated in the first and second dehumidification modes. The first and second dehumidification modes may be included in an outdoor dehumidification mode, and the operation of the ventilation device 100 may be additionally distinguished into an indoor dehumidification mode.

The indoor dehumidification mode may remove moisture contained in air, which is sucked from the indoor space while circulating air of the indoor space through the ventilation device 100, and supply the dehumidified air to the indoor space again.

In the outdoor dehumidification mode, the outdoor air, which is introduced into the ventilation device 100 through the first inlet 101a, may be heat-exchanged through the total heat exchanger 110, and then the heat-exchanged air may be supplied to the indoor space through the first outlet 101b by passing through the first and second heat exchangers 120 and 130.

In this case, the connection flow path opening/closing unit 330 may be in a closed state to prevent the air, which is introduced from the indoor space, from being mixed with the outdoor air A1.

In the indoor dehumidification mode, the indoor air, which is introduced into the ventilation device 100 through the second inlet 101c, may be moved to the second inlet chamber 105 through the connection flow path 102a without being moved to the second outlet 101d through the total heat exchanger 110, and then the air may be circulated into the indoor space through the first outlet 101b by passing through the first and second heat exchangers 120 and 130.

In this case, the connection flow path opening/closing unit 330 may be in an open state to allow the air, which is introduced from the indoor space, to be moved into the connection flow path 102a.

Accordingly, the ventilation device 100 may be selectively operated in one of the outdoor dehumidification mode, in which the outdoor air 13 flows into the indoor space I, and the indoor dehumidification mode, in which the indoor air is circulated into the indoor space.

Hereinafter a ventilation device 100' according to an embodiment of the disclosure will be described. The configuration other than a connection flow path 102b and a connection flow path opening/closing unit 340 described below are the same as those of the integrated air conditioning system 1 according to the above-described embodiment, and thus a description thereof will be omitted.

Figure 15:
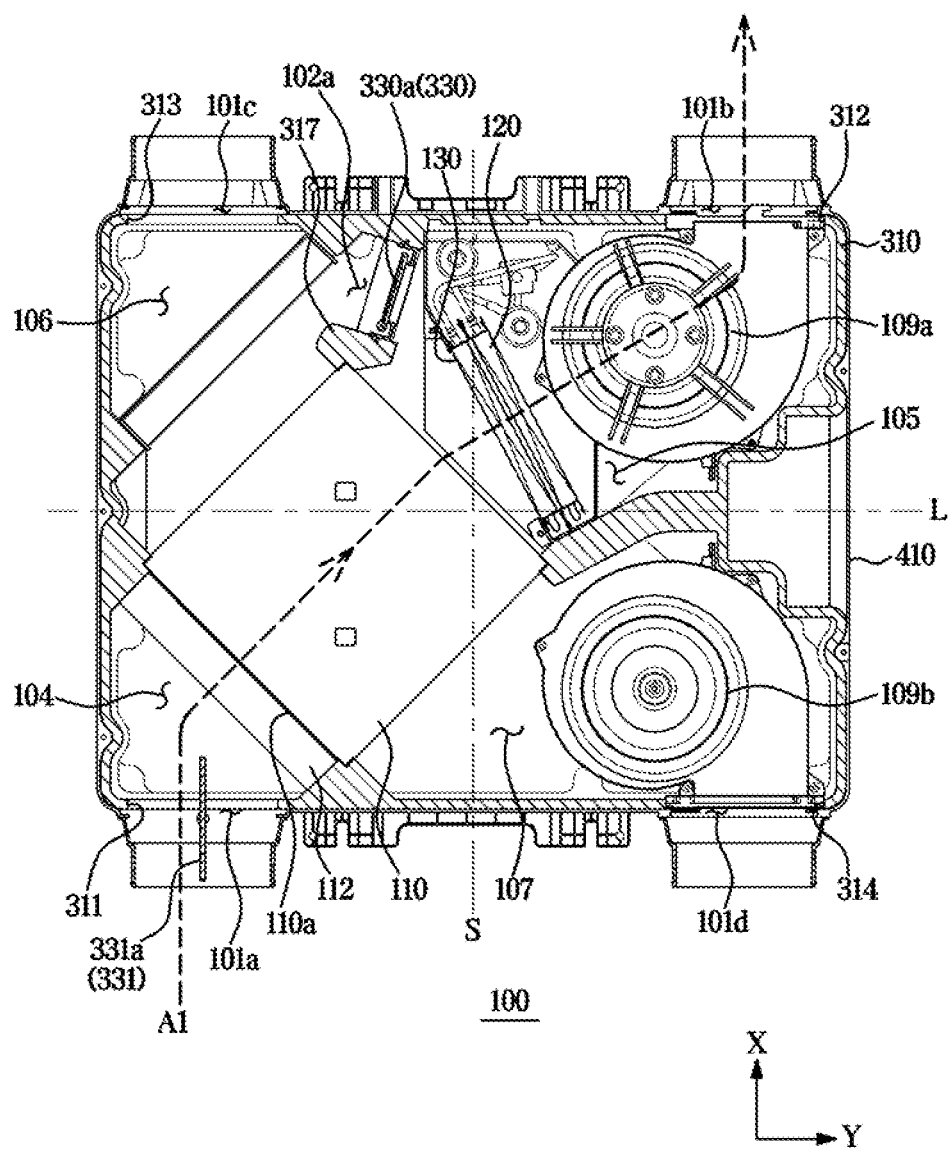
FIG. 15 is a view schematically illustrating a flow of air in a ventilation device according to an embodiment of the disclosure.
Figure 16:
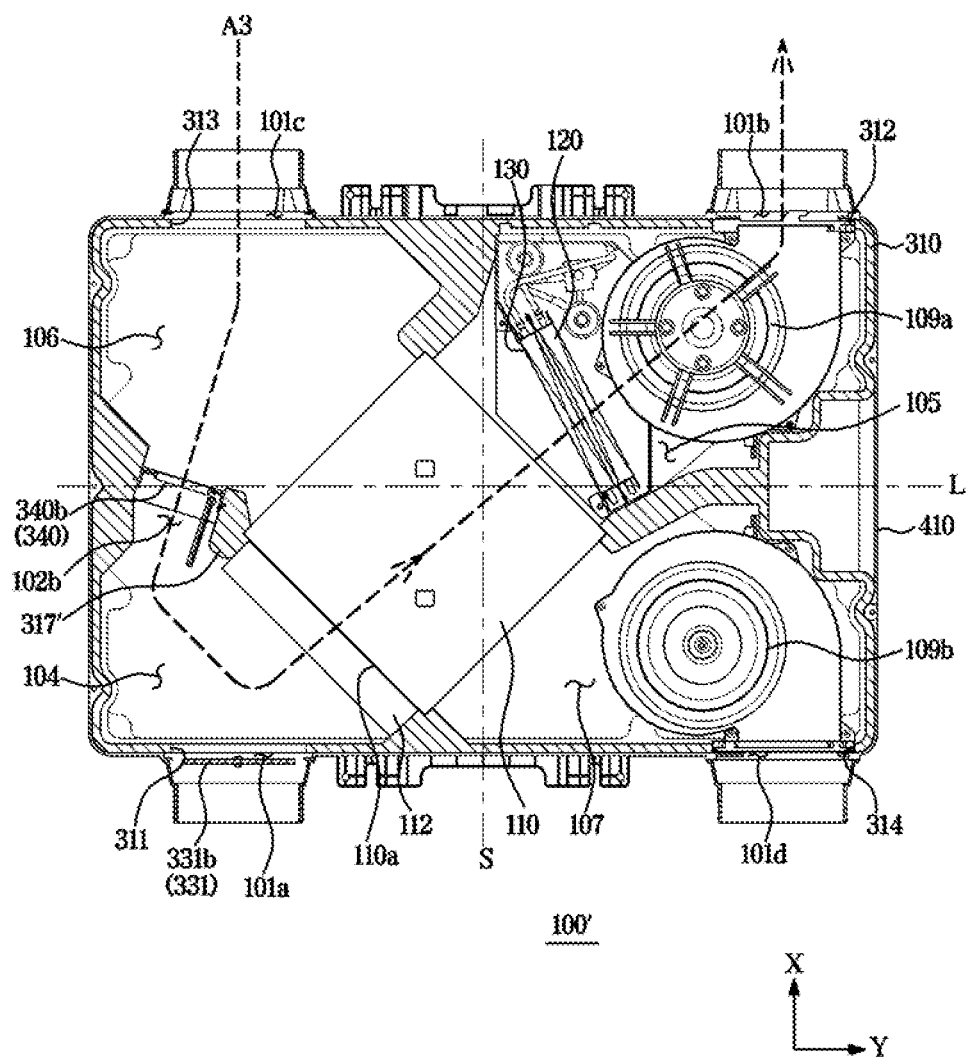
FIG. 16 is a view schematically illustrating a flow of air in a mode, which is different from the flow of air illustrated in FIG. 15, in the ventilation device according to an embodiment of the disclosure.

FIG. 15 is a view schematically illustrating a flow of air in a ventilation device according to an embodiment of the disclosure, and FIG. 16 is a view schematically illustrating a flow of air in a mode, which is different from the flow of air illustrated in FIG. 15, in the ventilation device according to an embodiment of the disclosure.

As illustrated in FIGS. 15 and 16, the housing 101 may include a connection flow path 102b provided to connect at least one portion of the inlet flow path 102 and the outlet flow path 103.

For example, the connection flow path 102b may be disposed on the partition wall 108 arranged between the first outlet chamber 105 and the first inlet chamber 104 and provided to define the first outlet chamber 105 and the first inlet chamber 104.

The partition wall 108 provided to define the first outlet chamber 105 and the first inlet chamber 104 may be formed with a partition wall forming portion 317' of the first inner housing 310 and a partition wall forming portion (not shown) of the second inner housing 320. The connection flow path 102b may be formed by cutting at least a portion of the partition wall.

Accordingly, the first outlet chamber 106 and the first inlet chamber 104 may be provided to communicate with each other.

The ventilation device 100 may include a connection flow path opening/closing unit 340 disposed on the connection flow path 102*b* and configured to open and close the connection flow path 102*b*.

The connection flow path opening/closing unit 340 may selectively open and close the connection flow path 102*b* to allow the first outlet chamber 106 and the first inlet chamber 104 to selectively communicate with each other.

As described above, in the ventilation device 100, the dehumidification mode may be distinguished into the outdoor dehumidification mode and the indoor dehumidification mode.

The outdoor dehumidification mode may supply dehumidified air to the indoor space by removing moisture in the outdoor air introduced into the ventilation device 100.

The indoor dehumidification mode may remove moisture contained in air, which is sucked from the indoor space, while circulating air of the indoor space the ventilation device 100, and supply the dehumidified air to the indoor space again.

In the outdoor dehumidification mode, outdoor air A1, which is introduced into the ventilation device 100 through the first inlet 101*a*, may be heat-exchanged through the total heat exchanger 110, and then the heat-exchanged air may be supplied to the indoor space through the first outlet 101*b* by passing through the first and second heat exchangers 120 and 130, as illustrated in FIG. 15.

In this case, the connection flow path opening/closing unit 340 may be in a closed state 340*a* to prevent the air, which is introduced from the indoor space, from being mixed with the outdoor air A1.

In addition, the first inlet opening/closing unit 331 may be provided in an open state 331*a* to allow the outdoor air A1 to be introduced into the ventilation device 100.

In the indoor dehumidification mode, indoor air A3, which is introduced into the ventilation device 100 through the second inlet 101*c*, may be moved to the second inlet chamber 105 through the connection flow path 102*b* by passing though the filter 112 and the total heat exchanger 110, and the air may be circulated into the indoor space through the first outlet 101*b* by passing through the first and second heat exchangers 120 and 130, as illustrated in FIG. 16.

In this case, the connection flow path opening/closing unit 340 may be in an open state 340*b* to allow the indoor air A3, which is introduced from the indoor space, to be moved into the connection flow path 102*b*.

In addition, the first inlet opening/closing unit 331 may be provided in a closed state 331*b* to prevent the outdoor air from being introduced into the ventilation device 100 and then from being mixed with the indoor air A3.

That is, while the indoor air A3 is circulated by the ventilation device 100, the indoor air A3 may pass through the filter 112 of the ventilation device 100 and thus foreign substances flowing in the indoor air A3 may be collected.

Accordingly, in the indoor dehumidification mode, the ventilation device 100 may collect foreign substances in the air without an additional device such as an air purifier in the indoor space, and thus it is possible to circulate clean air in the indoor space.

In addition, the ventilation device 100 may be operated in an air cleaning mode. In the air cleaning mode, the heat exchangers 120 and 130 are not operated and only the blower 109*a* is operated to circulate the indoor air.

In this case, the indoor air, which is introduced into the ventilation device 100 through the second inlet 101*c*, may be moved to the second inlet chamber 105 through the connection flow path 102*b* by passing through the filter 112 and the total heat exchanger 110, and then the air may be circulated to the indoor space through the first outlet 101*b* by passing through the first and second heat exchangers 120 and 130 that is not operated.

While the disclosure has been described with reference to example embodiments, it should be understood by those of skilled in the art that various changes in form and details may be made without departing from the spirit and scope of the disclosure. Thus, the example embodiments are merely examples and should not be construed as being limiting.

What is claimed is:

1. An integrated air conditioning system, comprising:
   an outdoor unit including a compressor and a condenser to circulate a refrigerant;
   an indoor unit connected to the outdoor unit;
   an indoor temperature sensor configured to measure an indoor temperature;
   an indoor humidity sensor configured to measure an indoor humidity;
   a ventilation device connected to the outdoor unit and configured to exchange indoor air with outdoor air, wherein the ventilation device includes:
      a housing including an inlet flow path to suck outdoor air to an indoor space, and an outlet flow path to discharge indoor air to an outdoor space,
      a total heat exchanger in which air flowing through the inlet flow path and air flowing through the outlet flow path exchange heat with each other,
      a first heat exchanger disposed on the inlet flow path and configured to receive a refrigerant from the outdoor unit through a first refrigerant pipe,
      a second heat exchanger disposed upstream of the first heat exchanger on the inlet flow path and configured to be supplied with refrigerant discharged from the first heat exchanger via a second refrigerant pipe connecting the second heat exchanger to the first heat exchanger,
      a first expansion device disposed on the first refrigerant pipe to expand the refrigerant supplied from the outdoor unit to the first heat exchanger,
      a second expansion device disposed on the second refrigerant pipe to expand the refrigerant discharged from the first heat exchanger and supplied to the second heat exchanger; and
   a controller configured to:
      in response to the indoor temperature measured by the indoor temperature sensor being greater than a set temperature and the indoor humidity measured by the indoor humidity sensor being greater than a set humidity, control the ventilation device to be operated in a first dehumidification mode in which the first heat exchanger and the second heat exchanger are configured to cool and dehumidify the air as the first expansion device expands the refrigerant,
      in response to the indoor temperature measured by the indoor temperature sensor being less than the set temperature and the indoor humidity measured by the indoor humidity sensor being greater than the set humidity, control the ventilation device to be operated in a second dehumidification mode in which the first heat exchanger is configured to heat the air as the first expansion device does not expand the refrigerant, and the second heat exchanger is configured to dehumidify the air as the second expansion device expands the refrigerant, in response to a difference between the indoor humidity measured by the indoor humidity sensor and the set humidity being less than an end humidity value when the ventilation device is operated in the first dehumidification mode, control the ventilation device to be operated in a ventilation mode by turning off the outdoor unit or preventing the refrigerant from flowing into the first heat exchanger and the second heat exchanger, wherein the ventilation mode is a mode in which the first heat exchanger and the second heat exchanger are not operated and heat exchange is performed by the total heat exchanger, and, in response to a difference between the indoor humidity measured by the indoor humidity sensor the set humidity and being less than the end humidity value when the ventilation device is operated in the second dehumidification mode, control the ventilation device to be operated in the ventilation mode by turning off the outdoor unit or preventing the refrigerant from flowing into the first heat exchanger and the second heat exchanger.

2. The integrated air conditioning system of claim 1, wherein
air sucked into the inlet flow path sequentially passes through the total heat exchanger, the second heat exchanger, and the first heat exchanger, and then is discharged into the indoor space.

3. The integrated air conditioning system of claim 2, wherein
the first heat exchanger is configured to heat or dehumidify air and the second heat exchanger is configured to dehumidify air.

4. The integrated air conditioning system of claim 3, wherein
in response to the first expansion device expanding the refrigerant, the first heat exchanger and the second heat exchanger are configured to cool and dehumidify the air, which passes through the first heat exchanger and the second heat exchanger, by evaporating the refrigerant.

5. The integrated air conditioning system of claim 4, wherein
in response to the first expansion device not expanding the refrigerant and the second expansion device expanding the refrigerant, the second heat exchanger is configured to dehumidify the air passing through the second heat exchanger by evaporating the refrigerant, and the first heat exchanger is configured to heat the air passing through the first heat exchanger by condensing the refrigerant.

6. The integrated air conditioning system of claim 1, wherein
the total heat exchanger is disposed on the outlet flow path, and
the indoor temperature sensor and the indoor humidity sensor are disposed inside the housing and are disposed upstream of the total heat exchanger on the outlet flow path.

7. The integrated air conditioning system of claim 1, further comprising:
a discharge temperature sensor configured to measure a discharge temperature, which is a temperature of air discharged into the indoor space after passing through the first and second heat exchangers; and
a cooling fan configured to cool the condenser,
wherein the controller is configured to control a rotation speed of the cooling fan.

8. The integrated air conditioning system of claim 7, wherein
in response to the discharge temperature measured by the discharge temperature sensor being greater than the indoor temperature measured by the indoor temperature sensor, the controller is configured to increase the rotation speed of the cooling fan, and
in response to the discharge temperature measured by the discharge temperature sensor being less than the indoor temperature measured by the indoor temperature sensor, the controller is configured to reduce the rotation speed of the cooling fan.

9. The integrated air conditioning system of claim 1, further comprising:
a distributor configured to receive the refrigerant from the outdoor unit,
wherein
the indoor unit is configured to receive the refrigerant from the outdoor unit via the distributor, and
the ventilation device is configured to receive the refrigerant from the outdoor unit via the distributor.

10. The integrated air conditioning system of claim 1, wherein
at least one of the first expansion device and the second expansion device includes an electronic expansion valve in which a degree of opening is adjustable.

11. The integrated air conditioning system of claim 1, wherein
at least one of the first expansion device and the second expansion device includes a solenoid valve and a capillary tube connected in parallel to the solenoid valve.

12. The integrated air conditioning system of claim 1, wherein
the housing includes:
a first inlet chamber including an inlet through which the outdoor air is introduced into the housing, the inlet flow path being formed in the first inlet chamber, and
a second inlet chamber to communicate with the first inlet chamber by the total heat exchanger and including an outlet through which air in the inlet flow path is discharged to the indoor space, and
the first heat exchanger and the second heat exchanger are disposed inside the second inlet chamber.

* * * * *